(12) United States Patent
Kawakami

(10) Patent No.: US 8,170,917 B2
(45) Date of Patent: May 1, 2012

(54) INFORMATION COMMUNICATION SYSTEM, CONTENT OUTPUT APPARATUS, USER APPARATUS, CONTENT DELIVERY APPARATUS, AND METHODS FOR CONTROLLING CONTENT OUTPUT APPARATUS, USER APPARATUS, AND CONTENT DELIVERY APPARATUS

(75) Inventor: Hidehiko Kawakami, Nagoya (JP)

(73) Assignee: DENSO CORPORATION, Kariya (JP)

( * ) Notice: Subject to any disclaimer, the term of this patent is extended or adjusted under 35 U.S.C. 154(b) by 862 days.

(21) Appl. No.: 12/078,880

(22) Filed: Apr. 8, 2008

(65) Prior Publication Data
US 2008/0249889 A1 Oct. 9, 2008

(30) Foreign Application Priority Data
Apr. 9, 2007 (JP) .................................. 2007-102104

(51) Int. Cl.
*G06Q 30/00* (2012.01)
(52) U.S. Cl. ......... 705/26.1; 709/201; 709/219; 700/94; 705/27.1
(58) Field of Classification Search .................... 705/26, 705/27, 26.1, 27.1; 709/201, 219; 700/94
See application file for complete search history.

(56) References Cited

U.S. PATENT DOCUMENTS

| 2003/0220835 | A1* | 11/2003 | Barnes, Jr. ........................ 705/14 |
| 2004/0121723 | A1* | 6/2004 | Poltorak ........................ 455/3.01 |
| 2006/0004788 | A1* | 1/2006 | Pilgrim et al. ................. 707/100 |
| 2007/0012163 | A1* | 1/2007 | Ijichi ............................... 84/600 |

FOREIGN PATENT DOCUMENTS

| JP | A-07-297818 | 11/1995 |
| JP | A-2002-116769 | 4/2002 |
| JP | A-2004-062728 | 2/2004 |
| JP | A-2005-267157 | 9/2005 |
| JP | A-2005-332175 | 12/2005 |
| JP | A-2006-309518 | 11/2006 |

OTHER PUBLICATIONS

"Honda, Nissan, Audi, Volkswagen, Sony, Rockford, Pioneer, Alpine, Fujitsu Ten, Clarion, Kenwood and PhatNoise Adopt Gracenote Technology in Hard-Disk-Drive Devices," Gracenote News, International CES, Jan. 8, 2004, accessed Dec. 19, 2011 at http://www.gracenote.com/company_info/press/2004/2004010800/.*
Office Action dated Dec. 4, 2008 in corresponding Japanese patent application No. 2007-102104 (and English translation).

\* cited by examiner

*Primary Examiner* — Yogesh C Garg
*Assistant Examiner* — Anne Georgalas
(74) *Attorney, Agent, or Firm* — Posz Law Group, PLC

(57) ABSTRACT

In an information communication system, a portable apparatus stores owned content information as list information about a content already purchased by a user. The portable apparatus transmits the owned content information to an in-vehicle apparatus capable of wireless communication. When the in-vehicle apparatus does not store the content the user already purchased, the in-vehicle apparatus acquires content data for the content from a content delivery server. The information communication system can automatically supplement the in-vehicle apparatus to be used by the user with the content the user already purchased. As a result, the user can use the already purchased content on the in-vehicle apparatus without any inconvenient operations.

19 Claims, 13 Drawing Sheets

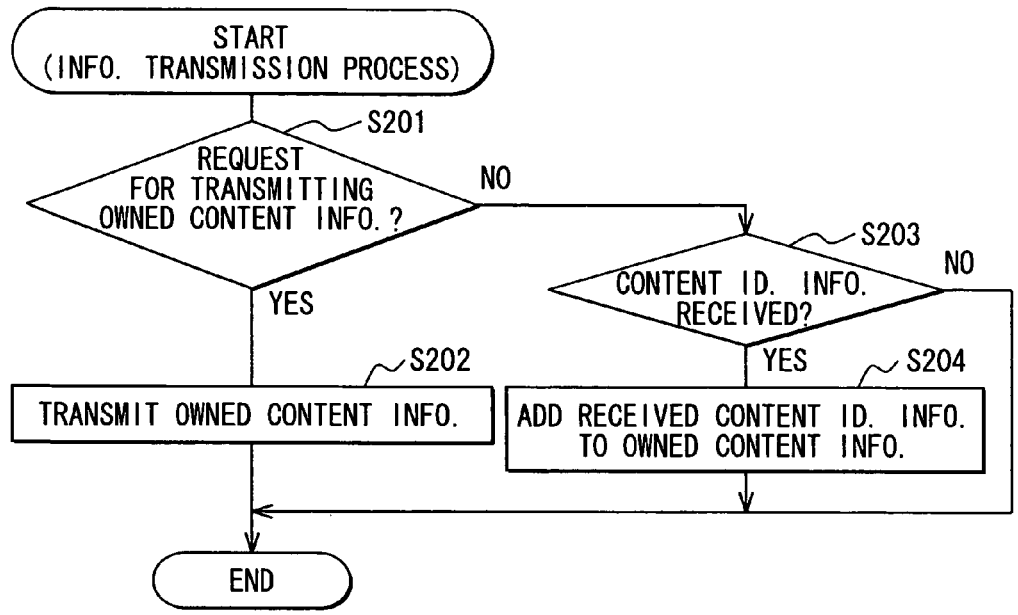
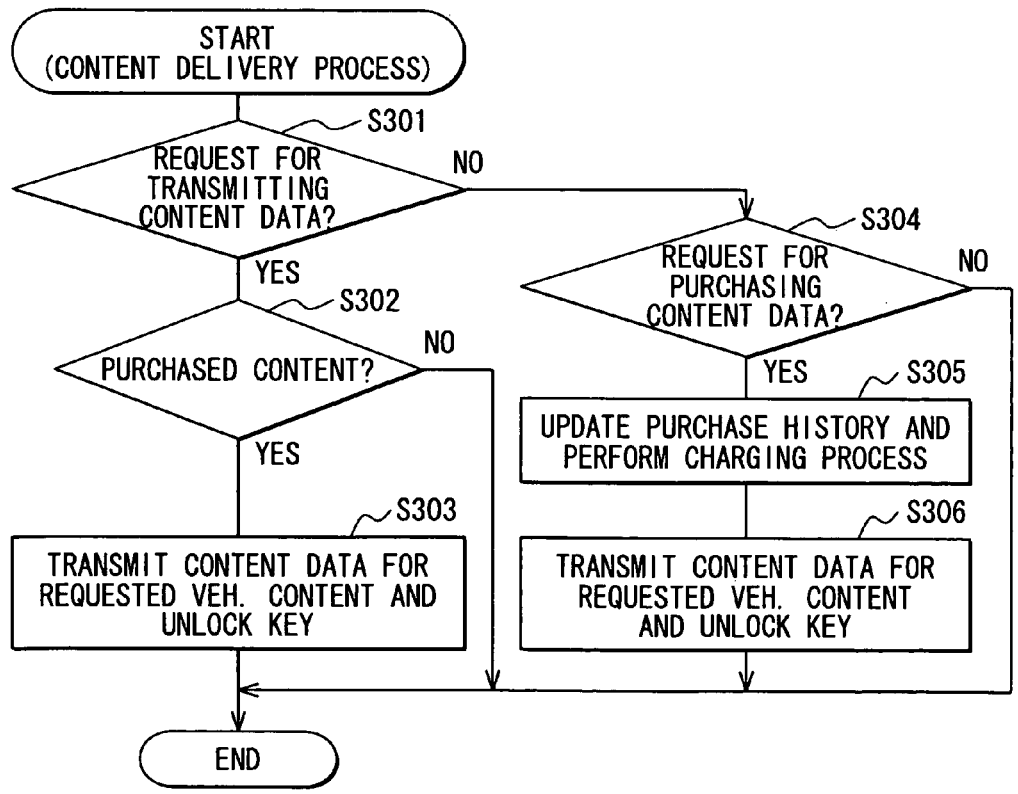

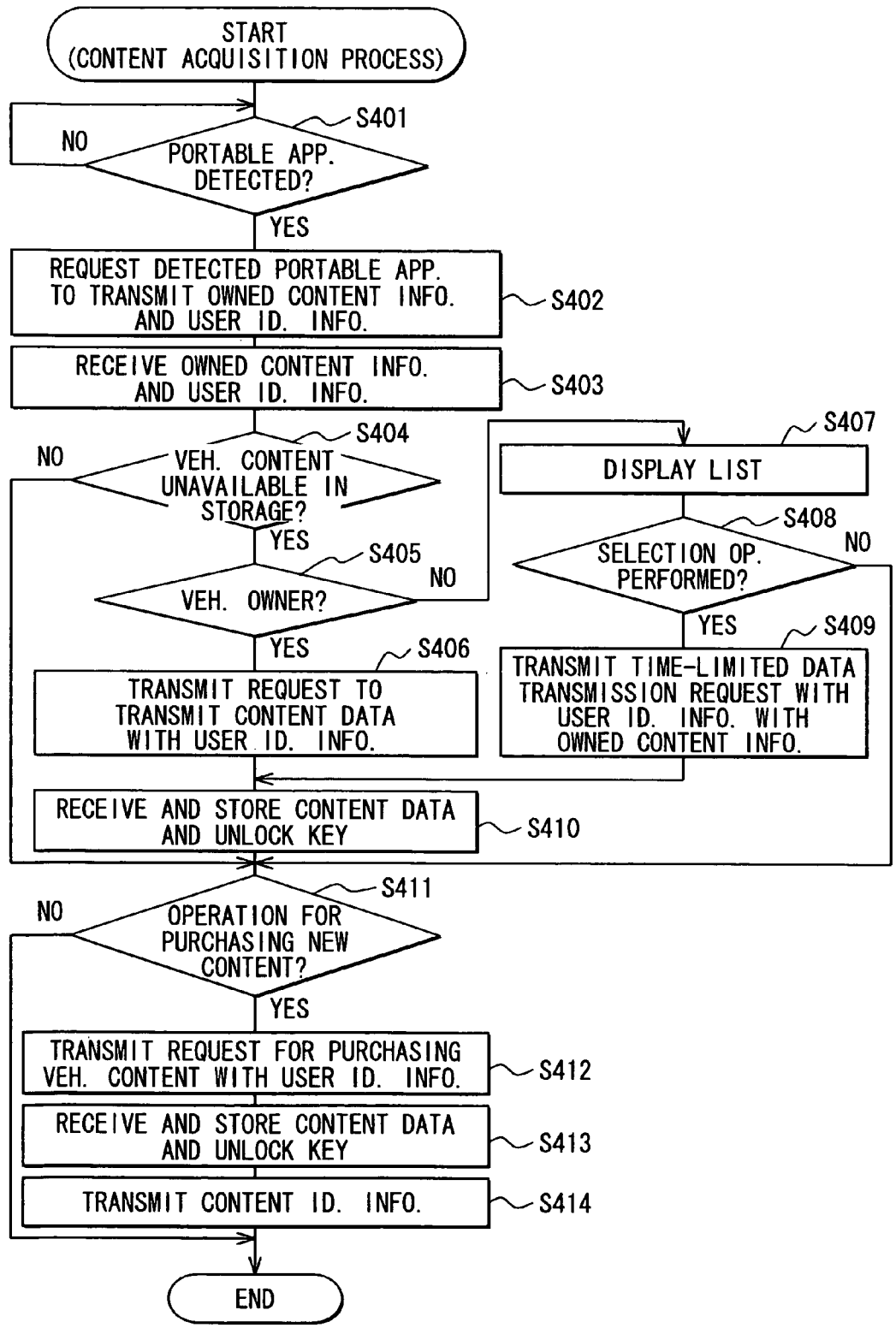

INFORMATION COMMUNICATION SYSTEM, CONTENT OUTPUT APPARATUS, USER APPARATUS, CONTENT DELIVERY APPARATUS, AND METHODS FOR CONTROLLING CONTENT OUTPUT APPARATUS, USER APPARATUS, AND CONTENT DELIVERY APPARATUS

CROSS REFERENCE TO RELATED APPLICATION

This application is based on and incorporates herein by reference Japanese Patent Application No. 2007-102104 filed on Apr. 9, 2007.

FIELD OF THE INVENTION

The present invention relates to an information communication system for using contents.

BACKGROUND OF THE INVENTION

Conventionally, there is known an information communication system including a content delivery apparatus and a content output apparatus. The content delivery apparatus deliver content data. The content output apparatus can output contents represented by content data downloaded from the content delivery apparatus. Various techniques are proposed for such information communication system for protecting the copyright of content data and improving the convenience of content users.

For example, Patent Document 1 discloses the information communication system that allows a group of specific authorized users to use contents received or purchased via a communication link on terminals other than the reception terminal. This information communication system uses a card that stores a user identification number unique to the card and a group secrete key common to the group. A user inserts the card into a terminal that stores contents. The user further enters a password to use a content.

According to the construction disclosed in Patent Document 2, a user other than a vehicle owner saves music data in a music delivery server. The music data can be reproduced free of charge on a music reproduction apparatus mounted on the vehicle. When a user wishes music delivery on the music reproduction apparatus, he or she supplies his or her user ID to the music reproduction apparatus. After the authentication is confirmed between the music reproduction apparatus and a music delivery apparatus, the user requests to download music data to be delivered.

Patent Document 3 discloses the construction that enables users to enjoy purchased contents at various locations. Specifically, a recording medium records identification information that ensures the right to output contents. A user inserts the recording medium into a content output apparatus for outputting contents. The content output apparatus reads the identification information recorded on the recording medium. When the user has the right to output content data, he or she can download the content data to the content output apparatus from a sever apparatus.

Patent Document 1: JP-H7-297818 A
Patent Document 2: JP-2002-116769 A
Patent Document 3: JP-2004-62728 A According to the above-mentioned constructions, however, the user needs to perform operations for acquiring content data from a content delivery apparatus so as to output the purchased content to the content output apparatus that does not store the content data. The user feels it inconvenient to perform such operations consciously.

SUMMARY OF THE INVENTION

The present invention has been made in consideration of the foregoing. It is therefore an object of the present invention to provide an information communication system capable of allowing a user to use contents purchased by the user without needing for complicated operations on a content output apparatus that does not store the content data.

According to an example of the present invention, an information communication system is provided as follows. The system includes a content output apparatus capable of outputting a content represented by content data stored in a content storage device, a content delivery apparatus for delivering content data to the content output apparatus, and a user apparatus carried by a user using the content output apparatus. The user apparatus includes: an owning information storage device for storing owned content information as list information about a content already purchased by a user of the user apparatus; and an owning information transmission control unit for transmitting the owned content information to a content output apparatus capable of wireless communication with the user apparatus. The content output apparatus includes: a content purchase control unit for, when a user requests to purchase a content, transmitting a purchase request for content data along with purchaser information capable of specifying a user as a purchaser to the content delivery apparatus and storing content data received from the content delivery apparatus in the content storage device; and a content supplement control unit for, when the content storage device does not store content data for a content specified based on owned content information received from a user apparatus capable of wireless communication with the content output apparatus, transmitting a request to transmit unstored content data along with owner information capable of specifying a user of the user apparatus to the content delivery apparatus and storing content data received from the content delivery apparatus in the content storage device. The content delivery apparatus includes: a content transmission control unit for, when receiving a purchase request for content data from the content output apparatus, storing purchase information about a content as a purchase history of a user specified based on purchaser information received with the purchase request and transmitting the content data to a requesting content output apparatus; and a content retransmission control unit for, when receiving a transmission request for content data from the content output apparatus, transmitting the content data to a requesting content output apparatus on condition that purchase information about the content is stored as a purchase history of a user specified based on owner information received with the transmission request.

As another example of the present invention, the content output apparatus included in the above information communication system is provided.

As another example of the present invention, the user apparatus included in the above information communication system is provided.

As another example of the present invention, the content delivery apparatus included in the above information communication system is provided.

According to another example of the present invention, a method is provided for controlling the above content output apparatus. The method comprises: (i) transmitting, when a user requests to purchase a content, a purchase request for content data along with purchaser information capable of specifying a user as a purchaser to the content delivery apparatus and storing content data received from the content delivery apparatus in the content storage device; and (ii) transmitting, when the content storage device does not store content data for a content specified based on owned content information received from a user apparatus capable of wireless communication with the content output apparatus, a request to transmit unstored content data along with owner information capable of specifying a user of the user apparatus to the content delivery apparatus and storing content data received from the content delivery apparatus in the content storage device. Relating to this example, as yet another example of the present invention, a computer readable medium comprising instructions being executed by a computer is provided, wherein the instructions includes the above method for controlling the content output apparatus and the method is computer-implemented.

According to another example of the present invention, a method is provided for controlling the above user apparatus. The method comprises: transmitting the owned content information to a content output apparatus capable of wireless communication with the user apparatus. Relating to this example, as yet another example of the present invention, a computer readable medium comprising instructions being executed by a computer is provided, wherein the instructions includes the above method for controlling the user apparatus and the method is computer-implemented.

According to another example of the present invention, a method is provided for controlling the above content delivery apparatus. The method comprises: (i) storing, when receiving a purchase request for content data from the content output apparatus, purchase information about a content as a purchase history of a user specified based on purchaser information received with the purchase request and transmitting the content data to a requesting content output apparatus; and (ii) transmitting, when receiving a transmission request for content data from the content output apparatus, the content data to a requesting content output apparatus on condition that purchase information about the content is stored as a purchase history of a user specified based on owner information received with the transmission request. Relating to this example, as yet another example of the present invention, a computer readable medium comprising instructions being executed by a computer is provided, wherein the instructions includes the above method for controlling the content delivery apparatus and the method is computer-implemented.

BRIEF DESCRIPTION OF THE DRAWINGS

The above and other objects, features, and advantages of the present invention will become more apparent from the following detailed description made with reference to the accompanying drawings. In the drawings:

FIG. 3 is a flow chart showing an information transmission process according to the first embodiment;

FIG. 4 is a flow chart showing a content delivery process according to the first embodiment;

FIG. 5 is a flow chart showing a content acquisition process according to a second embodiment;

DETAILED DESCRIPTION OF THE PREFERRED EMBODIMENTS

Embodiments of the present invention will be described in further detail with reference to the accompanying drawings.

<1. First Embodiment>

The information communication system according to a first embodiment will be described.

<1-1. Overall Construction>

Figure 1:
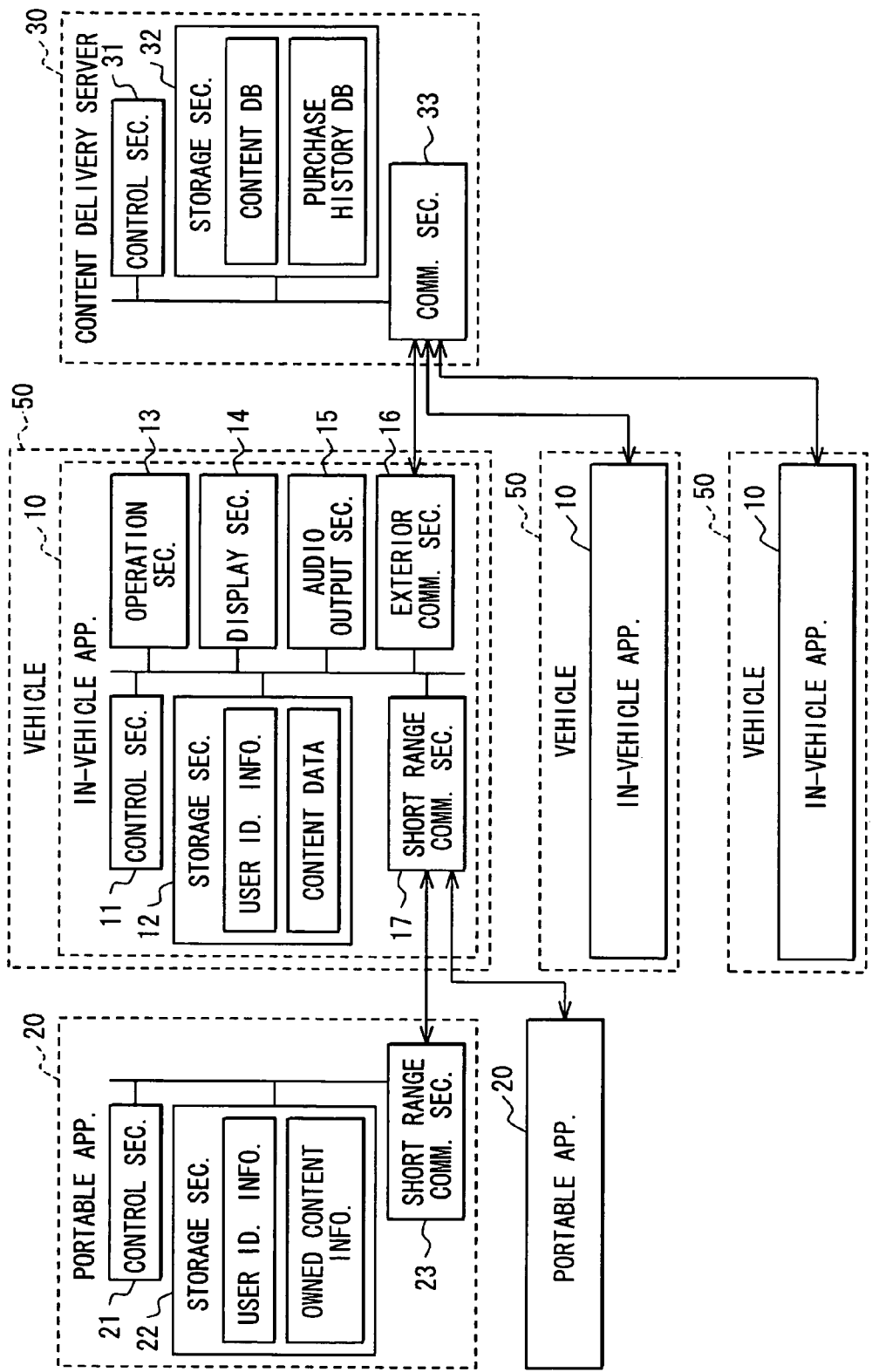
FIG. 1 is a block diagram schematically showing a construction of an information communication system according to a first embodiment.

FIG. 1 is a block diagram schematically showing a construction of an information communication system according to the first embodiment.

The information communication system includes an in-vehicle apparatus 10, a portable apparatus 20, and a content delivery server 30. The in-vehicle apparatus 10 is mounted on a vehicle 50. The portable apparatus 20 is carried by a user. The content delivery server 30 delivers data (content data) for a content (hereafter referred to as a vehicle content) available on the in-vehicle apparatus 10.

The following describes specific constructions of the apparatuses 10, 20, and 30 included in the information communication system.

<1-1-1. Construction of the In-Vehicle Apparatus>

The in-vehicle apparatus 10 includes a control section 11, a storage section 12, an operation section 13, a display section 14, an audio output section 15, an exterior communication section 16, and a short range communication section 17. The in-vehicle apparatus 10 need not be always constructed as a stand-alone apparatus but may include multiple apparatuses mounted on the vehicle 50.

The control section 11 mainly includes a known microcomputer having a CPU, ROM, and RAM, and performs various processes. The storage section 12 stores various types of information on a recording medium such as a hard disk.

Specifically, the storage section 12 previously stores user identification information, i.e., identification information specific to a user (vehicle owner) of the vehicle 50 where the in-vehicle apparatus 10 is mounted. For example, the user identification information is written to the storage section 12 when the user subscribes to the information communication system.

The storage section 12 stores content data downloaded from the content delivery server 30. The in-vehicle apparatus 10 can output a vehicle content in accordance with operations of a user in the vehicle 50. The vehicle content represents content data stored in the storage section 12. To prevent an illegal copy, content data can be output only when an unlock key unique to each content data is used. The storage section 12 stores not only content data but also the unlock key corresponding to the content data.

The operation section 13 is used to enter user's instructions as external operations. For example, the operation section 13 includes a touch switch integrated with the display section 14 and a mechanical switch.

The display section 14 displays various types of information for a user in the vehicle 50. For example, the display section 14 uses an liquid crystal display.

The audio output section 15 outputs sounds such as speech and music from a speaker provided in an interior of the vehicle 50.

The exterior communication section 16 enables data communication with the content delivery server 30 via the Internet.

The short range communication section 17 provides short range radio communication with the portable apparatus 20. The short range communication section 17 enables radio communication with the portable apparatus 20 found in a communication area (capable of short range radio communication) that covers the entire interior of the vehicle 50. The short range radio communication includes Bluetooth (registered trademark), DSRC (Dedicated Short Range Communication), wireless LAN, and ZIGBEE (registered trademark), for example.

<1-1-2. Construction of the Portable Apparatus>

The portable apparatus 20 is a portable terminal (portable telephone terminal according to the embodiment) that can be carried by a user in the vehicle 50. The portable apparatus 20 includes a control section 21, a storage section 22, and a short range communication section 23.

The control section 21 mainly includes a known microcomputer having a CPU, ROM, and RAM, and performs various processes.

The storage section 22 can store various types of information.

The storage section 22 previously stores user identification information, i.e., identification information unique to a user that is a user of the portable apparatus 20. The user identification information is written to the storage section 22 when the user subscribes to the information communication system, for example.

The storage section 22 also stores owned content information, i.e., list information about a vehicle content purchased by the user who owns the portable apparatus 20. Specifically, content identification information is stored as the owned content information. The content identification information can uniquely specify a vehicle content. According to the embodiment, part of content data is used as the content identification information.

The short range communication section 23 provides short range radio communication with the in-vehicle apparatus 10.

<1-1-3. Construction of the Content Delivery Server>

The content delivery server 30 is used for vehicle content delivery. A vendor for selling vehicle contents manages the content delivery server 30. The content delivery server 30 includes a control section 31, a storage section 32, and a communication section 33.

The control section 31 mainly includes a known microcomputer having a CPU, ROM, and RAM, and performs various processes.

The storage section 32 can store various types of information.

The storage section 32 stores a content database of content data representing vehicle contents to be delivered. In addition to the content data, the storage section 32 stores an unlock key corresponding to each content data.

The storage section 32 stores a purchase history database for managing a history of vehicle contents purchased in the past.

The communication section 33 enables data communication with the in-vehicle apparatus 10 via the Internet.

<1-2. Processes Performed on the Information Communication System>

The following describes processes performed on the apparatuses 10, 20, and 30 included in the information communication system according to the first embodiment.

<1-2-1. Content Acquisition Process>

Figure 2:
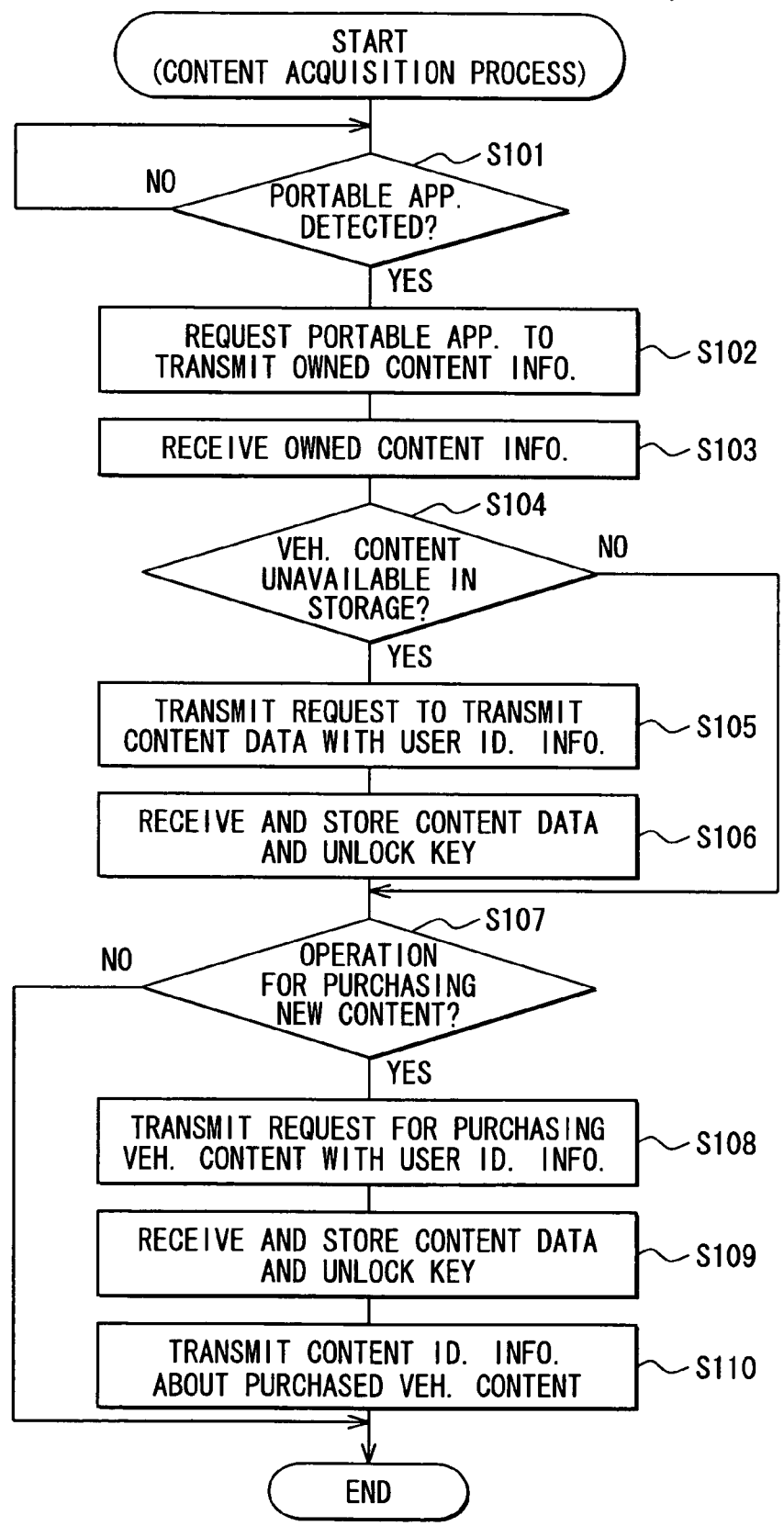
FIG. 2 is a flow chart showing a content acquisition process according to the first embodiment.

The following describes a content acquisition process performed by the control section 11 of the in-vehicle apparatus 10 with reference to a flow chart in FIG. 2. The content acquisition process starts when the in-vehicle apparatus 10 is powered on by turning on an accessory switch (ACC switch) of the vehicle 50. The content acquisition process is continuously repeated until the in-vehicle apparatus 10 is powered off.

When starting the content acquisition process, the control section 11 determines at Step S101 whether or not the portable apparatus 20 owned by a vehicle owner is detected in the vehicle 50. When it is determined that the portable apparatus 20 is detected, the process proceeds to Step S102. Specifically, the control section 11 uses the short range communication section 17 to determine availability of the portable apparatus 20 that is capable of short range radio communication and stores the user identification information about the vehicle owner. That is, the control section 11 determines whether or not the user as an owner of the vehicle 50 gets in the vehicle 50.

At Step S102, the control section 11 uses the short range communication section 17 to transmit owning information transmission request, i.e., a request to transmit the owned content information, to the portable apparatus 20 owned by the vehicle owner. The portable apparatus 20 owned by the vehicle owner transmits the owned content information to the in-vehicle apparatus 10 (at Step S202 in an information transmission process (FIG. 3) to be described later).

At Step S103, the control section 11 receives the owned content information from the portable apparatus 20.

At Step S104, the control section 11 determines whether or not a vehicle content (purchased by the vehicle owner) represented by the owned content information received at Step S103 is found to be unavailable in the storage section 12. That is, the control section 11 determines whether or not the vehicle content purchased by the vehicle owner is not stored in the in-vehicle apparatus 10, i.e., whether or not the vehicle owner purchased the vehicle content using an apparatus other than the in-vehicle apparatus 10.

When it is determined at Step S104 that there is a vehicle content whose content data is not stored in the storage section 12, the process proceeds to Step S105. At Step S105, the control section 11 uses the exterior communication section 16 to transmit a missing data transmission request along with the user identification information about the vehicle owner to the content delivery server 30. The missing data transmission request is issued to transmit content data for a missing vehicle content. The user identification information is stored in the storage section 12. The content delivery server 30 transmits content data for the missing vehicle content and an unlock key to the in-vehicle apparatus 10 (Step S303 in a content delivery process (FIG. 4) to be described later). The unlock key makes the content data available.

At Step S106, the control section 11 receives the content data and the unlock key from the content delivery server 30 and stores them in the storage section 12. The process then proceeds to Step S107.

The process proceeds to Step S107 by skipping Steps S105 and S106 when it is determined at Step S104 that there is no vehicle content whose content data is not stored in the storage section 12.

At Steps S101 through S106, the control section 11 downloads from the content delivery server 30 and supplements content data that corresponds to the vehicle content purchased by the vehicle owner in the past and is not stored in the in-vehicle apparatus 10.

At Step S107, the control section 11 determines whether or not the user operates the operation section 13 for requesting purchase of a new vehicle content. The process proceeds to Step S108 when it is determined that the user performs a purchase operation.

The user requests purchase of content data representing the vehicle content. At Step S108, the control section 11 allows the exterior communication section 16 to transmit that purchase request along with the user identification information about the vehicle owner (purchaser) to the content delivery server 30. The user identification information is stored in the storage section 12. In this manner, the content delivery server 30 transmits content data for the vehicle content requested for the purchase and the unlock key for making the content data available to the in-vehicle apparatus 10 (Step S306 in the content delivery process (FIG. 4) to be described later).

At Step S109, the control section 11 receives the content data and the unlock key from the content delivery server 30 and stores them in the storage section 12. In this manner, the content data for the purchased vehicle content is added to the purchased content data already stored in the storage section 12.

At Step S110, the control section 11 allows the short range communication section 17 to transmit the content identification information about the purchased vehicle content to the portable apparatus 20 owned by the vehicle owner. In this manner, the information about the newly purchased vehicle content is added to the owned content information stored in the portable apparatus 20 (Step S204 of the information transmission process (FIG. 3) to be described later).

At Steps S107 through S110, the control section 11 determines whether or not the user performs an operation to purchase a vehicle content. When this is true, the control section 11 downloads content data for the vehicle content requested for the purchase from the content delivery server 30 and notifies this event to the portable apparatus 20.

<1-2-2. Information Transmission Process>

The following describes the information transmission process performed by the control section 21 of the portable apparatus 20 with reference to a flow chart in FIG. 3. The information transmission process starts when the portable apparatus 20 is powered on. The information transmission process is continuously repeated until the portable apparatus 20 is powered off.

When starting the information transmission process, the control section 21 determines at Step S201 whether or not it receives an owning information transmission request for the owned content information. As mentioned above (Steps S101 and S102), the in-vehicle apparatus 10 transmits the owning information transmission request using the short range radio communication when the user carrying the portable apparatus 20 gets in the vehicle 50 owned by the user.

The process proceeds to Step S202 when it is determined at Step S201 that the owning information transmission request is received. The control section 21 transmits the owned content information stored in the storage section 22 to a requesting apparatus. The process returns to Step S201. That is, the portable apparatus 20 detects the in-vehicle apparatus 10 in short range radio communication with the portable apparatus 20 based on an owning information transmission request. At this point, the portable apparatus 20 transmits the owned content information to the in-vehicle apparatus 10.

The process proceeds to Step S203 when it is determined at Step S201 that no owning information transmission request is received. At Step S203, the control section 21 determines whether or not the content identification information is received. As mentioned above (Step S110), the in-vehicle apparatus 10 transmits the content identification information using the short range radio communication when the in-vehicle apparatus 10 is used to purchase a new vehicle content.

The process proceeds to Step S204 when it is determined at Step S203 that the content identification information is received. The control section 21 adds the received content identification information to the owned content information stored in the storage section 22. The process then returns to Step S201.

The process directly returns to Step S201 when it is determined at Step S203 that no content identification information is received.

<1-2-3. Content Delivery Process>

The following describes a content delivery process performed by the control section 31 of the content delivery server 30 with reference to a flow chart in FIG. 4. The content delivery process starts when the content delivery server 30 is powered on. The content delivery process is continuously repeated until the content delivery server 30 is powered off.

When starting the content delivery process, the control section 31 determines at Step S301 whether or not a missing data transmission request is received. The missing data transmission request is used to transmit content data for a vehicle content missing in the in-vehicle apparatus 10. As mentioned above (Steps S104 and S105), the in-vehicle apparatus 10 transmits the missing data transmission request along with the user identification information about the vehicle owner when the vehicle content purchased by the vehicle owner is not stored in the in-vehicle apparatus 10.

The process proceeds to Step S302 when it is determined at Step S301 that the missing data transmission request is received. The control section 31 determines whether or not the vehicle content corresponding to the missing data transmission request is already purchased. Specifically, the control section 31 references the purchase history database stored in the storage section 32 and determines whether or not the user corresponding to the received user identification information purchased the requested vehicle content in the past.

The process proceeds to Step S303 when it is determined at Step S302 that the requested vehicle content is already purchased. The control section 31 transmits the content data for the requested vehicle content and the unlock key for making the content data available to the requesting apparatus. The process then returns to Step S301.

The process proceeds to Step S304 when it is determined at Step S301 that no missing data transmission request is received. The control section 31 determines whether or not a request for purchasing content data is received. As mentioned above (Steps S107 and S108), the in-vehicle apparatus 10 transmits the content data purchase request along with the user identification information about the vehicle owner when the in-vehicle apparatus 10 is operated to request purchase of a new vehicle content.

The process proceeds to Step S305 when it is determined at Step S304 that the content data purchase request is received. The control section 31 updates the purchase history database stored in the storage section 32 and performs a charging process. Specifically, the control section 31 rewrites the purchase history database so as to add the vehicle content for the purchase request to a purchase history of the user corresponding to the received user identification information. The control section 31 then performs the charging process for collecting an equivalent fee from the user.

At Step S306, the control section 31 transmits the content data for the vehicle content corresponding to the purchased request and the unlock key for making the content data available to the requesting apparatus. The process then returns to Step S301.

The process directly returns to Step S301 when it is determined at Step S304 that no content data purchase request is received.

<1-3. Examples of Use>

The following describes examples of using the information communication system according to the first embodiment. It is supposed that a user A owns multiple vehicles 50 such as vehicles A1 and A2 for convenience of explanation.

Let us assume the in-vehicle apparatus 10 mounted on the vehicle A1 to be an in-vehicle apparatus A1 for convenience of explanation. For example, the user A in the vehicle A1 carries the portable apparatus 20 and uses the in-vehicle apparatus A1 to perform an operation for purchasing a new vehicle content such as updated map data for a navigation system. The content data for the vehicle content is downloaded from the content delivery server 30. In this manner, the user A can use the purchased vehicle content on the in-vehicle apparatus A1. The content identification information about the purchased vehicle content is automatically transmitted from the in-vehicle apparatus A1 to the portable apparatus 20. The content identification information is added to the owned content information, i.e., list information about vehicle contents already purchased by the user.

When the user A carrying the portable apparatus 20 gets into the vehicle A2, the in-vehicle apparatus 10 mounted on the vehicle A2 detects the portable apparatus 20. This in-vehicle apparatus 10 is referred to as an in-vehicle apparatus A2 for convenience of explanation. The owned content information stored in the portable apparatus 20 is automatically acquired. Content data for the vehicle content missing in the in-vehicle apparatus A2 is automatically downloaded to the in-vehicle apparatus A2 from the content delivery server 30. As a result, the user A can use the in-vehicle apparatus A2 even for a vehicle content that is purchased through the in-vehicle apparatus A1.

1-4. Effects

As mentioned above, the information communication system according to the first embodiment can provide the following effects.

When the user as the owner of the vehicle 50 carries the portable apparatus 20 and gets into the vehicle 50, the system automatically supplements a vehicle content that is already purchased by the user and is not stored in the in-vehicle apparatus 10 mounted on the vehicle 50. The system can transparently make a vehicle content purchased on the vehicle 50 owned by the user available also on another vehicle 50 owned by the user without giving any inconvenience to the user.

The portable apparatus 20 detects the in-vehicle apparatus 10 that can wirelessly communicate with the portable apparatus 20. At the time of the detection, the portable apparatus 20 transmits the owned content information to the in-vehicle apparatus 10. The system can supplement a missing vehicle content before the user gets into the vehicle 50 and starts using vehicle contents on the in-vehicle apparatus 10.

The portable apparatus 20 transmits the owned content information in accordance with a request from the in-vehicle apparatus 10. The system can decrease unnecessary transmission processes compared to a construction that transmits the owned content information independently of a request from the in-vehicle apparatus 10 or periodically, for example.

When the user purchases a vehicle content, the system updates the owned content information stored in the portable apparatus 20 of the user. The owned content information can be up-to-date.

The in-vehicle apparatus 10 transmits the content identification information about the purchased vehicle content only to the portable apparatus 20 of the user as a purchaser. The system prevents the owned content information stored in another user's portable apparatus 20 from being updated inadvertently.

<1-5. Correspondence between Technical Terms Used for the Embodiments and Functions>

In the information communication system according to the first embodiment, the in-vehicle apparatus 10 may function as a content output apparatus. The control section 11 performing Steps S101 through S106 of the content acquisition process (FIG. 2) may function as a content supplement control means or unit. The control section 11 performing Steps S107 through S109 may function as a content purchase control means or unit. The control section 11 performing Step S110 may function as a purchase information notification control means or unit. The storage section 12 may function as a content storage device.

The portable apparatus 20 may function as a user apparatus. The control section 21 performing Steps S201 and S202 of the information transmission process (FIG. 3) may function as an owning information transmission control means or unit. The control section 21 performing Steps S203 and S204 may function as an owning information update control means or unit. The storage section 22 may function as an owning information storage device.

The content delivery server 30 may function as a content delivery apparatus. The control section 31 performing Steps S301 through S303 of the content delivery process (FIG. 4) may function as a content retransmission control means or unit. The control section 31 performing Steps S304 through S306 may function as a content transmission control means or unit.

<2. Second Embodiment>

The information communication system according to a second embodiment will be described. The overall construction diagram is the same as FIG. 1 for the information communication system according to the first embodiment.

<2-1. Overall Construction>

The information communication system according to the second embodiment differs from the information communication system according to the first embodiment in making available vehicle contents purchased by users in the past other than the vehicle owner with time limitation. The following mainly describes differences from the information communication system according to the first embodiment. The same parts or components are depicted by the same reference numerals and a detailed description is omitted for simplicity.

<2-2. Processes Performed on the Information Communication System>

The following describes processes performed on the apparatuses 10, 20, and 30 included in the information communication system according to the second embodiment.

<2-2-1. Content Acquisition Process>

The following describes a content acquisition process performed by the control section 11 of the in-vehicle apparatus 10 with reference to a flow chart in FIG. 5. The content acquisition process according to the second embodiment differs from the content acquisition process (FIG. 2) according to the first embodiment in that Steps S104 through S104 are replaced by Steps S401 through S404 and Steps S405 and S407 through S409 are added. The process contents of Steps S406 and S410 through S414 are the same as those of Steps S105 through S110 and a detailed description is omitted for simplicity.

When starting the content acquisition process, the control section 11 determines at Step S401 whether or not the portable apparatus 20 is detected in the vehicle 50. The portable apparatus 20 may or may not be owned by a vehicle owner. When it is determined that the portable apparatus 20 is detected, the process proceeds to Step S402. Specifically, the control section 11 uses the short range communication section 17 to determine availability of the portable apparatus 20 that is capable of short range radio communication. That is, the control section 11 determines whether or not the user carrying the portable apparatus 20 gets in the vehicle 50.

At Step S402, the control section 11 allows the short range communication section 17 to transmit an owning information transmission request to the portable apparatus 20 detected at Step S401. The owning information transmission request is issued to transmit the owned content information and the user identification information. In this manner, the portable apparatus 20 owned by the user in the vehicle 50 transmits the owned content information and the user identification information to the in-vehicle apparatus 10 (Step S502 of the information transmission process (FIG. 6) to be described later). When it is determined at Step S401 that multiple portable apparatuses 20 are detected, the control section 11 transmits an owning information transmission request to each of the portable apparatuses 20.

At Step S403, the control section 11 receives the owned content information and the user identification information from the portable apparatus 20.

At Step S404, the control section 11 determines whether or not the storage section 12 stores no content data for the vehicle content (already purchased by the user in the vehicle 50) represented by the owned content information received at Step S403. That is, the control section 11 determines whether or not the vehicle content purchased by the user in the vehicle 50 is not stored in the in-vehicle apparatus 10. When it is determined at Step S401 that multiple portable apparatuses 20 are detected, the determination at Step S404 is performed for the owned content information received from each of the portable apparatuses 20. Further, Steps S405 through S410 are performed.

The process proceeds to Step S405 when it is determined at Step S404 that there is a vehicle content whose content data is not stored in the storage section 12. The control section 11 determines whether or not the vehicle owner owns the portable apparatus 20 as a transmission origin of the owned content information. Specifically, the control section 11 determines whether or not the user identification information received with the owned content information matches the vehicle owner's user identification information stored in the storage section 12.

The process proceeds to Step S406 when it is determined at Step S405 that the vehicle owner owns the portable apparatus 20. The process at Step S406 (same as Step S105) is performed and then proceeds to Step S410.

The process proceeds to Step S407 when it is determined at Step S405 that the vehicle owner does not own the portable apparatus 20. At Step S407, the control section 11 displays a list of names of missing vehicle contents on the display section 14. The control section 11 prompts the user in the vehicle 50 to select a missing vehicle content to be downloaded using the operation section 13.

At Step S408, the control section 11 determines whether or not the selection operation is performed.

The process proceeds to Step S409 when it is determined at Step S408 that the selection operation is performed. At Step S409, the control section 11 allows the exterior communication section 16 to transmit a time-limited data transmission request along with the user identification information received with the owned content information to the content delivery server 30. The time-limited data transmission request is issued to transmit time-limited content data for the vehicle content selected by the selection operation. The time-limited content data limits a time period (e.g., 12 hours) allowed to output contents and enables the temporary use of vehicle contents. In this manner, the content delivery server 30 transmits time-limited content data for the missing vehicle content and an unlock key for making the content data available to the in-vehicle apparatus 10 (Step S606 of a content delivery process (FIG. 7) to be described later). The process then proceeds to Step S410. The downloaded time-limited content data is deleted from the storage section 12 after expiration of the period allowed for the output.

The process proceeds to Step S411 by skipping Steps S409 and S410 when it is determined at Step S408 that no selection operation is performed. According to the embodiment, the control section 11 determines that no selection operation is performed when the control section 11 displays a list of vehicle contents on the display section 14 and detects no selection operation after lapse of a given time (e.g., one minute).

The content acquisition process according to the second embodiment enables the temporary use of vehicle contents purchased by a user other than the vehicle owner.

<2-2-2. Information Transmission Process>

Figure 6:
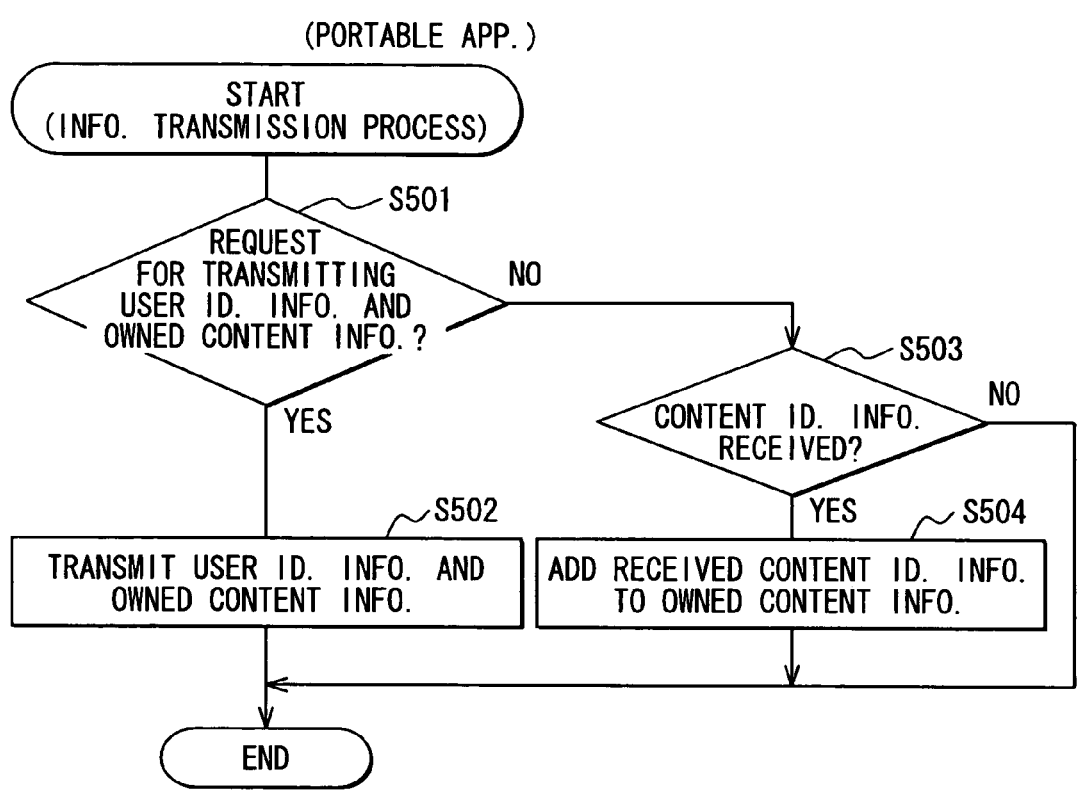
FIG. 6 is a flow chart showing an information transmission process according to the second embodiment.

The following describes an information transmission process performed by the control section 21 of the portable apparatus 20 with reference to a flow chart in FIG. 6. The information transmission process according to the second embodiment differs from the information transmission process (FIG. 3) according to the first embodiment in that Steps S201 and S202 are replaced by Steps S501 and S502. The process contents of Steps S503 and S504 are the same as those of Steps S203 and S204 and a detailed description is omitted for simplicity.

After starting the information transmission process, the control section 21 determines at Step S501 whether or not an owning information transmission request is received. The owning information transmission request is used to transmit the owned content information and the user identification information. As mentioned above (Steps S401 and S402), the in-vehicle apparatus 10 transmits the owning information transmission request when the user carrying the portable apparatus 20 gets into the vehicle 50.

The process proceeds to Step S502 when it is determined at Step S501 that the owning information transmission request is received. The control section 21 transmits the owned content information and the user identification information about the user as an owner of the portable apparatus 20 stored in the storage section 22 to a requesting apparatus. The process then returns to Step S501. That is, the portable apparatus 20 detects the in-vehicle apparatus 10 in short range radio communication with the portable apparatus 20 based on an owning information transmission request. At this point, the portable apparatus 20 transmits the owned content information and the user identification information to the in-vehicle apparatus 10.

The process proceeds to Step S503 when it is determined at Step S501 that no owning information transmission request is received.

<2-2-3. Content Delivery Process>

Figure 7:
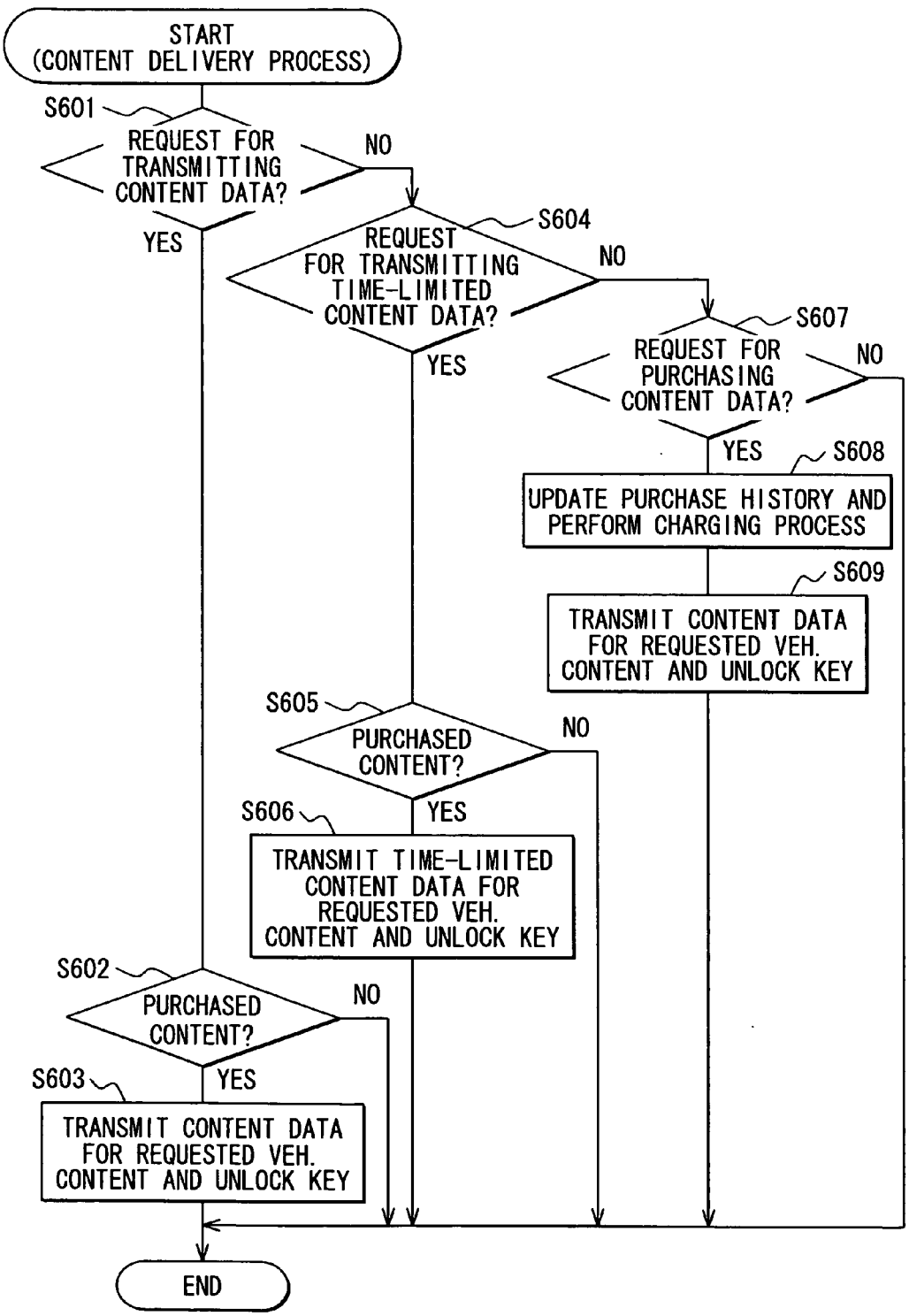
FIG. 7 is a flow chart showing a content delivery process according to the second embodiment.

The following describes a content delivery process performed by the control section 31 of the content delivery server 30 with reference to a flow chart in FIG. 7. The content delivery process according to the second embodiment differs from the content delivery process (FIG. 4) according to the first embodiment in addition of Steps S604 through S606. The process contents of Steps S601 through S603 and S607 through S609 are the same as those of Steps S301 through S306 and a detailed description is omitted for simplicity.

The process proceeds to Step S604 when it is determined at Step S601 that no missing data transmission request is received. The control section 31 determines whether or not a time-limited data transmission request is received. The time-limited data transmission request is used to transmit time-limited content data for the vehicle content. As mentioned above (Steps S404, S405, and S407 through S409), when a vehicle content is already purchased by a user other than the vehicle owner and is not stored in the in-vehicle apparatus 10, the in-vehicle apparatus 10 transmits the time-limited data transmission request along with the user identification information about the user.

The process proceeds to Step S605 when it is determined at Step S604 that the time-limited data transmission request is received. The control section 31 determines whether or not the vehicle content requested by the time-limited data transmission request is already purchased. Specifically, the control section 31 references the purchase history database stored in the storage section 32 and confirms whether or not the user corresponding to the received user identification information purchased the requested vehicle content in the past.

The process proceeds to Step S606 when it is determined at Step S605 that the requested vehicle content is already purchased. The control section 31 transmits time-limited content data for the requested vehicle content and an unlock key for making the content data available. The process then returns to Step S601.

The process proceeds to Step S607 when it is determined at Step S604 that no time-limited data transmission request is received.

<2-3. Examples of Use>

The following describes examples of using the information communication system according to the second embodiment. It is supposed that a user B owns the vehicle 50 such as a vehicle B for convenience of explanation.

Let us suppose that the user B carrying the portable apparatus 20 gets into the vehicle B and operates the in-vehicle apparatus 10 mounted on the vehicle B for purchasing a new vehicle content. This in-vehicle apparatus 10 is referred to as an in-vehicle apparatus B for convenience of explanation. Content data for the vehicle content is downloaded from the content delivery server 30. In this manner, the user B can use the purchased vehicle content on the in-vehicle apparatus B. The in-vehicle apparatus B automatically transmits the content identification information about the purchased vehicle content to the portable apparatus 20. The content identification information is added to the owned content information, i.e., list information about vehicle contents purchased by the user.

Let us assume another user C's vehicle 50 to be a vehicle C and the in-vehicle apparatus 10 mounted on the vehicle C to be an in-vehicle apparatus C for convenience of explanation. When the user B carrying the portable apparatus 20 gets into the vehicle C, the in-vehicle apparatus C detects the portable apparatus 20 and automatically acquires the owned content information stored in the portable apparatus 20. The display section 14 displays a list of vehicle contents missing on the in-vehicle apparatus C.

When the user B selects a vehicle content to be downloaded from the vehicle contents displayed on the display section 14, time-limited content data for the selected vehicle content is automatically downloaded from the content delivery server 30. As a result, the user B can temporarily uses the vehicle content purchased himself or herself in the past on the in-vehicle apparatus C.

<2-4. Effects>

As mentioned above, the information communication system according to the second embodiment provides the following effects in addition to the effects of the first embodiment.

When the user, not an owner of the vehicle 50, carries the portable apparatus 20 and gets into the vehicle 50, the system supplements time-limited content data for a vehicle content that is already purchased by the user and is not stored in the in-vehicle apparatus 10 mounted on the vehicle 50. Limiting the period capable of output can prevent illegal acquisition of vehicle contents. In addition, the system can make available vehicle contents purchased by users other than the vehicle owner. The user can use the content purchased himself or herself without needing to newly purchase it even when the user drives the vehicle 50 not owned by the user but by a company, for example.

Since the user can select time-limited content data to be downloaded, it is possible to prevent unnecessary time-limited content data from being automatically acquired despite the intention of the user.

<2-5. Correspondence between Technical Terms Used for the Embodiments and Functions>

In the information communication system according to the second embodiment, the in-vehicle apparatus 10 may function as a content output apparatus. The control section 11 performing Steps S401 through S410 of the content acquisition process (FIG. 5) may function as a content supplement control means or unit. The control section 11 performing Steps S411 through S413 may function as a content purchase control means or unit. The control section 11 performing Step S414 may function as a purchase information notification control means or unit. The storage section 12 may function as a content storage device.

The portable apparatus 20 may function as a user apparatus. The control section 21 performing Steps S501 and S502 of the information transmission process (FIG. 6) may function as an owning information transmission control means or unit. The control section 21 performing Steps S503 and S504 may function as an owning information update means or unit. The storage section 22 may function as an owning information storage device.

The content delivery server 30 may function as a content delivery apparatus. The control section 31 performing Steps S601 through S603 of the content delivery process (FIG. 7) may function as a content retransmission control means or unit. The control section 31 performing Steps S604 through S606 may function as a content transmission control means or unit. The control section 31 performing Steps 607 through S609 may function as a content transmission control means.

<3. Third Embodiment>

The information communication system according to a third embodiment will be described.

<3-1. Overall Construction>

Figure 8:
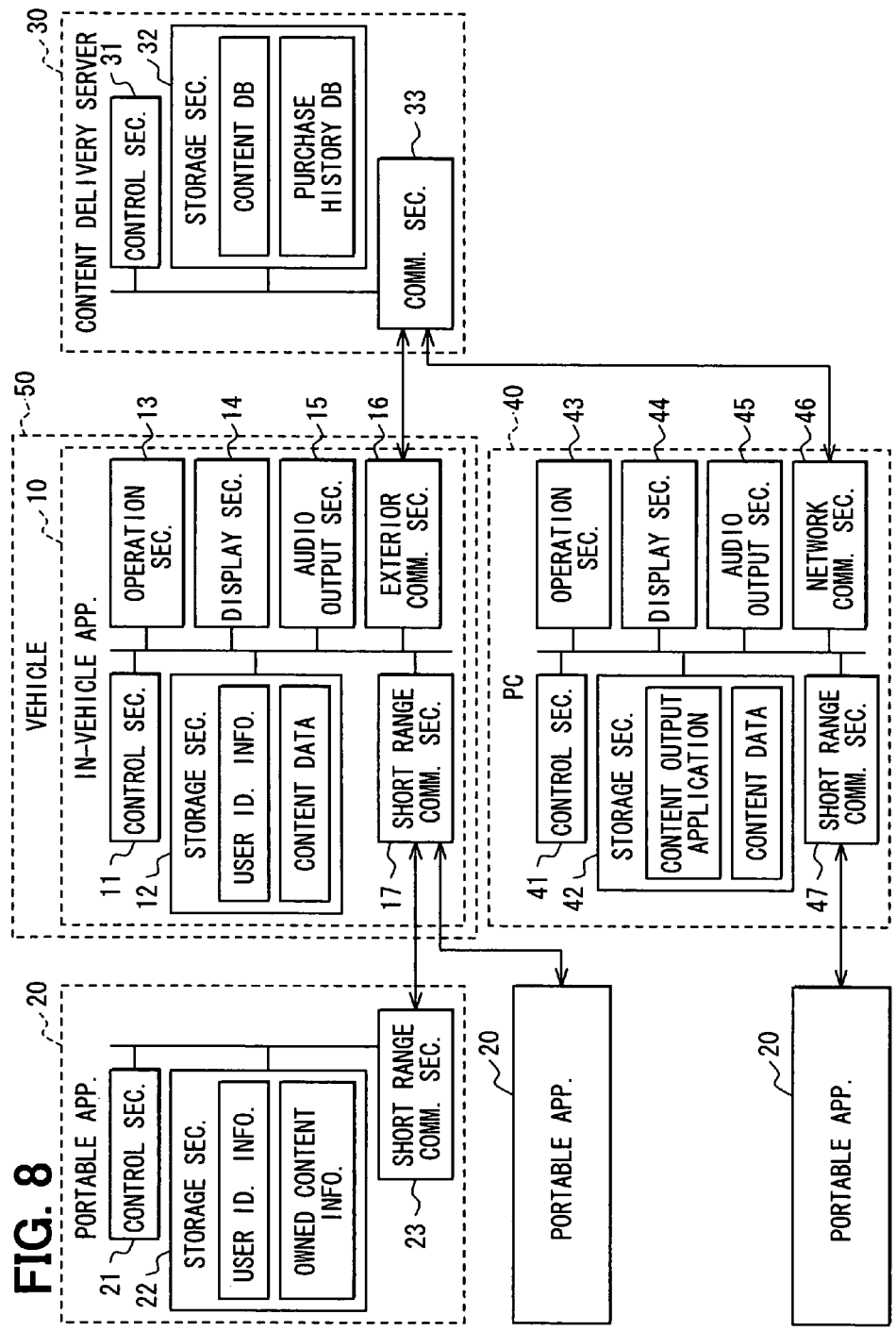
FIG. 8 is a block diagram schematically showing a construction of an information communication system according to a third embodiment.

FIG. 8 is a block diagram schematically showing a construction of the information communication system according to the third embodiment.

The information communication system according to the third embodiment differs from the information communication system (FIG. 1) according to the first embodiment in that there is provided a personal computer 40 (hereafter referred to as a PC) capable of communication with the portable apparatus 20 and the content delivery server 30. The following mainly describes differences from the information communication system according to the first embodiment. The same parts or components are depicted by the same reference numerals and a detailed description is omitted for simplicity.

<3-1-1. Construction of the PC>

A PC 40 is used in the user's home or a company. The PC 40 includes a control section 41, a storage section 42, an operation section 43, a display section 44, an audio output section 45, a network communication section 46, and a short range communication section 47.

The control section 41 mainly includes a known microcomputer having a CPU, ROM, and RAM, and performs various processes.

The storage section 42 can store various types of information in a recording medium such as a hard disk.

Specifically, the storage section 42 stores a content output application for outputting vehicle contents.

Further, the storage section 42 stores content data downloaded from the content delivery server 30 for each of users as purchasers. The content output application can output vehicle contents represented by the content data stored in the storage section 42.

The operation section 43 is used to enter user's instructions as external operations. For example, the operation section 43 includes a keyboard or a pointing device such as a mouse.

The display section 44 displays various types of information for a user. For example, the display section 44 uses an liquid crystal display.

The audio output section 45 outputs sounds such as speech and music from a speaker.

The network communication section 46 enables data communication with the content delivery server 30 via the Internet.

The short range communication section 47 provides short range radio communication with the portable apparatus 20. The short range communication section 47 enables radio communication with the portable apparatus 20 found in a communication area (capable of short range radio communication) near the PC 40.

<3-1-2. Constructions of the Other Apparatuses>

Constructions of the in-vehicle apparatus 10, the portable apparatus 20, and the content delivery server 30, and processes to be performed are the same as those of the first embodiment.

<3-2. Content Purchase Process>

Figure 9:
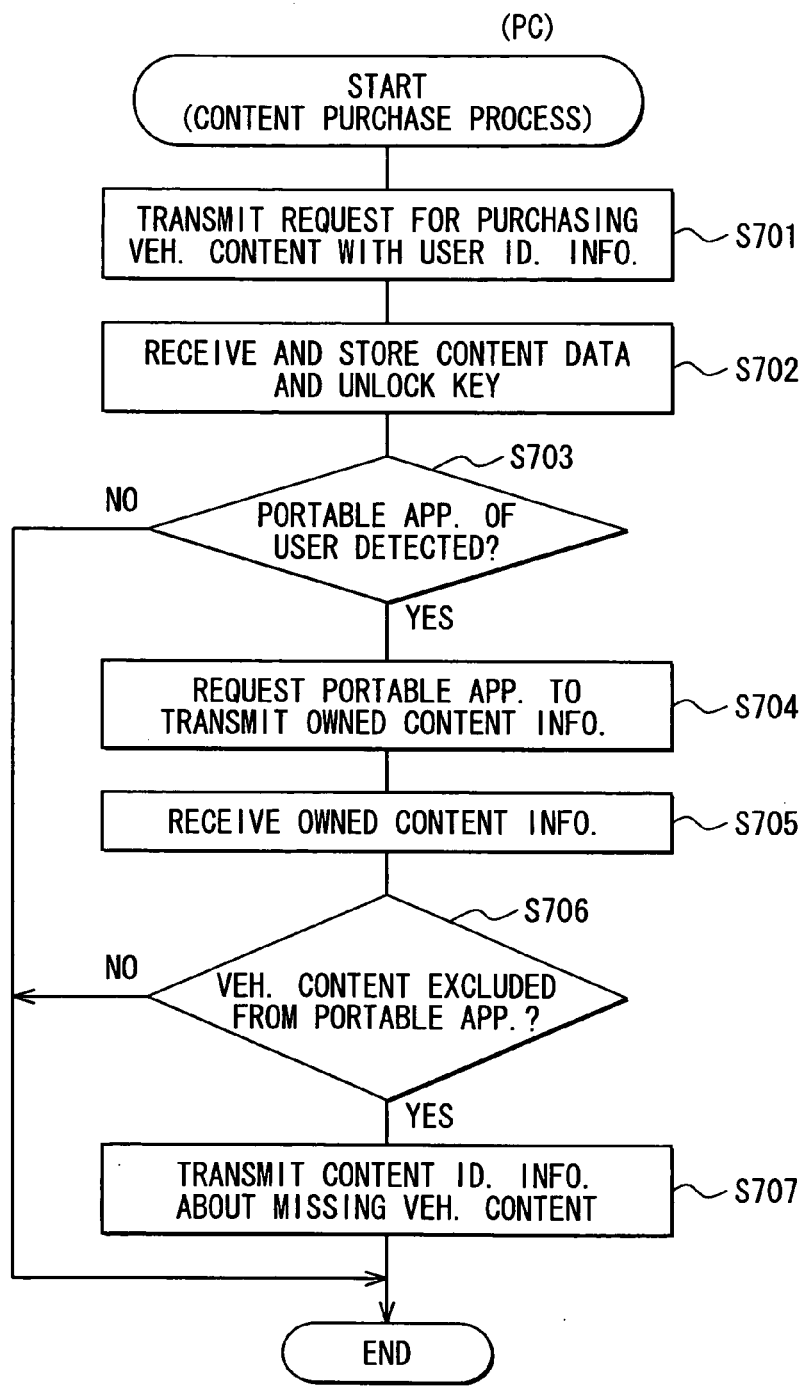
FIG. 9 is a flow chart showing a content purchase process according to the third embodiment.

The following describes a content purchase process performed by the control section 41 of the PC 40 with reference to a flow chart in FIG. 9. The content purchase process starts when the user operates the PC 40 for a request to purchase a vehicle content. For example, the user may use an Internet browser on the PC 40 for purchase operations. The user as a purchaser may need to enter his or her user identification information, password, etc. as needed.

When starting the content purchase process at Step S701, the control section 41 allows the network communication section 46 to transmit a purchase request for content data representing the vehicle content requested by the user along with the user identification information entered by the purchase operation to the content delivery server 30. The content delivery server 30 then transmits content data corresponding to the vehicle content requested for the purchase and an unlock key for making available the content data to the PC 40 (Step S306 of the content delivery process (FIG. 4) mentioned above).

At Step S702, the control section 41 receives the content data and the unlock key from the content delivery server 30 and stores them in the storage section 42. In this manner, the content data for the purchased vehicle content is added to the already purchased content data stored in the storage section 42.

At Step S703, the control section 41 determines whether or not the portable apparatus 20 owned by the user as a purchaser is found in a communication area capable of short range radio communication. Specifically, the control section 41 determines whether or not the portable apparatus 20 is capable of short range radio communication via the short range communication section 47 and corresponds to the stored user identification information entered by the purchase operation.

The content purchase process terminates when it is determined at Step S703 that the purchaser's portable apparatus 20 is unavailable.

The process proceeds to Step S704 when it is determined at Step S703 that the purchaser's portable apparatus 20 is available. The control section 41 allows the short range communication section 47 to transmit the owning information transmission request for transmitting the owned content information to the portable apparatus 20 owned by the user as the purchaser. In this manner, the portable apparatus 20 owned by the user as the purchaser transmits the owned content information to the PC 40 (Step S202 of the information transmission process (FIG. 3) mentioned above).

At Step S705, the control section 41 receives the owned content information from the portable apparatus 20.

At Step S706, the control section 41 determines whether or not a vehicle content is represented by the content data stored in the storage section 42 as purchased by the user in the past but is excluded from the owned content information received at Step S705. That is, the control section 41 determines whether or not there is a vehicle content that is purchased through the PC 40 but is excluded from the owned content information of the portable apparatus 20. For example, such vehicle content may be purchased through the PC 40 without using the portable apparatus 20.

The process proceeds to Step S707 when it is determined at Step S706 that the vehicle content is excluded from the owned content information. The control section 41 allows the short range communication section 47 to transmit the content identification information about the missing vehicle content to the portable apparatus 20 owned by the user. The information about the newly purchased vehicle content is added to the owned content information stored in the portable apparatus 20 (Step S204 of the information transmission process (FIG. 3) mentioned above).

The content purchase process terminates by skipping Step S707 when it is determined at Step S706 that no vehicle content is excluded from the owned content information.

<3-3. Examples of Use>

The following describes examples of using the information communication system according to the third embodiment.

When the user carrying the portable apparatus 20 performs an operation on the PC 40 in his or her home for purchasing a new vehicle content, content data for the vehicle content is downloaded from the content delivery server 30. The user can use the purchased vehicle content on the PC 40.

The owned content information stored in the portable apparatus 20 is automatically acquired. The PC 40 automatically transmits the content identification information about the vehicle content missing in the portable apparatus 20 to the portable apparatus 20. The system adds to the owned content information not only the content identification information about the most recently purchased vehicle content but also the content identification information about the vehicle content purchased in the past without using the portable apparatus 20. As a result, the user can use the vehicle content purchased on the PC 40 also on the in-vehicle apparatus 10 mounted in the vehicle 50.

<3-4. Effects>

As mentioned above, the information communication system according to the third embodiment provides the following effects in addition to the effects of the first embodiment.

The in-vehicle apparatus 10 transmits the content identification information about a vehicle content stored in the in-vehicle apparatus 10 but not in the portable apparatus 20 to the portable apparatus 20. Even when a vehicle content is purchased without using the portable apparatus 20, the system can appropriately update the owned content information stored in the portable apparatus 20 after the purchase.

<3-5. Correspondence between Technical Terms Used for the Embodiments and Functions>

In the information communication system according to the third embodiment, the PC 40 may function as a content output apparatus. The control section 41 performing Steps S701 and S702 of the content purchase process (FIG. 9) may function as a content purchase control means or unit. The control section 41 performing Steps S703 through S707 may function as an owning information notification control means or unit. The storage section 42 may function as a content storage device. The correspondence for the other sections is the same as the first embodiment.

<4. Fourth Embodiment>

The information communication system according to a fourth embodiment will be described.

<4-1. Overall Construction>

Figure 10:
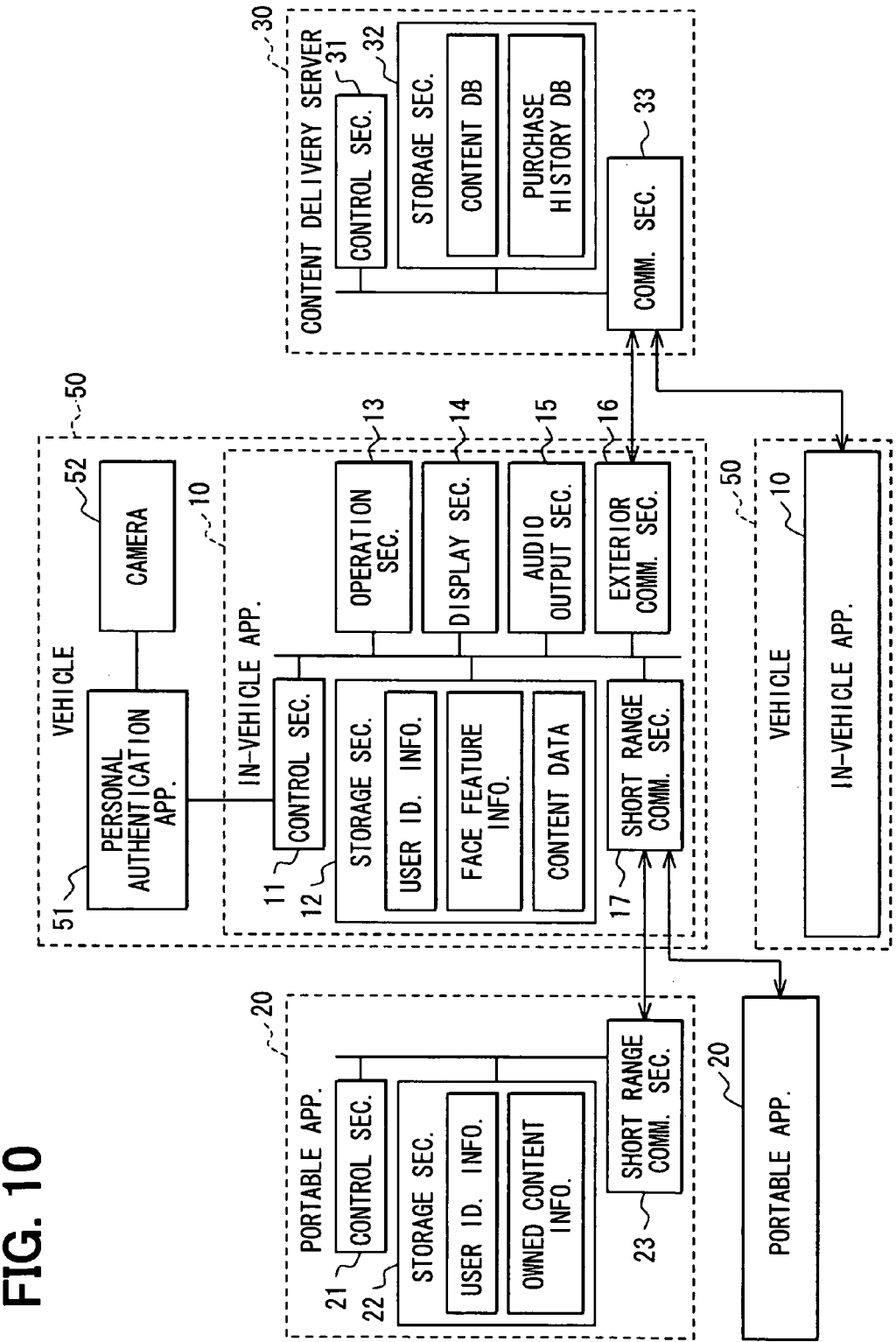
FIG. 10 is a block diagram schematically showing a construction of an information communication system according to a fourth embodiment.

FIG. 10 is a block diagram schematically showing a construction of the information communication system according to the fourth embodiment.

The information communication system according to the fourth embodiment differs from the information communication system (FIG. 1) according to the first embodiment in the following. The vehicle 50 is mounted with a personal authentication apparatus 51 and a camera 52. The control section 11 of the in-vehicle apparatus 10 is communicably connected with the personal authentication apparatus 51.

The personal authentication apparatus 51 authenticates a user sifting on a driver's seat based on his or her physical features. Specifically, the camera 52 is provided at the front of the driver's seat in the vehicle 50. The camera 52 can capture the face of the user sifting on the driver's seat. The personal authentication apparatus 51 authenticates a driver by detecting face feature points as the driver's physical feature from an image captured by the camera 52. The personal authentication apparatus 51 and the camera 52 can be replaced by those used for the other in-vehicle systems such as an inattentive driving prevention apparatus.

The storage section 12 of the in-vehicle apparatus 10 previously stores face feature information indicating the vehicle owner's face feature points.

When the vehicle owner does not get into the vehicle 50, the in-vehicle apparatus 10 inhibits output or purchase of vehicle contents. Specifically, the in-vehicle apparatus 10 performs the processes in the first embodiment and a content usage permission process to be described later. The following mainly describes differences from the information communication system according to the first embodiment. The same parts or components are depicted by the same reference numerals and a detailed description is omitted for simplicity.

<4-2. Content Usage Permission Process>

Figure 11:
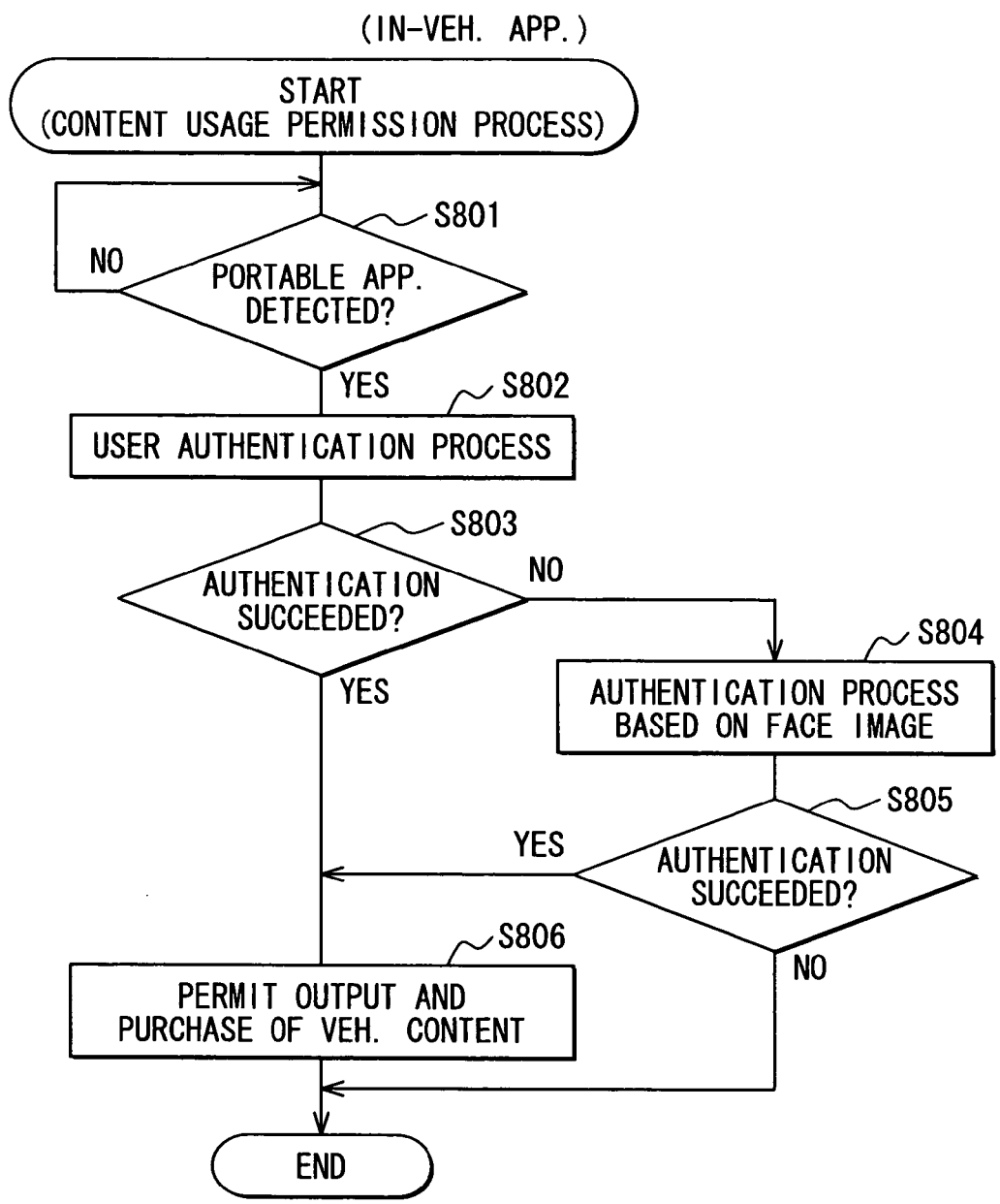
FIG. 11 is a flow chart showing a content usage permission process according to the fourth embodiment.

The following describes a content usage permission process performed by the control section 11 of the in-vehicle apparatus 10 with reference to a flow chart in FIG. 11. The content usage permission process starts when the in-vehicle apparatus 10 is powered on. The content usage permission process is continuously repeated until the in-vehicle apparatus 10 is powered off.

When starting the content usage permission process, the control section 11 determines at Step S801 whether or not the portable apparatus 20 is detected in the vehicle 50. The process proceeds to Step S802 when it is determined at Step S801 that the portable apparatus 20 is detected. Specifically, the control section 11 allows the short range communication section 17 to determine whether or not there is the portable apparatus 20 capable of short range radio communication. That is, the control section 11 determines whether or not a user carrying the portable apparatus 20 gets in the vehicle 50.

At Step S802, the control section 11 performs a user authentication process for determining whether or not the portable apparatus detected at Step S801 is owned by the vehicle owner. The user authentication process authenticates the vehicle owner based on the user identification information, password, etc.

At Step S803, the control section 11 determines whether or not the user authentication process succeeds at Step S802 to confirm that the portable apparatus 20 is owned by the vehicle owner.

The process proceeds to Step S804 when it is determined at Step S803 that the authentication fails. The control section 11 performs an authentication process based on a face image. Specifically, the control section 11 transmits the face feature information stored in the storage section 12 to the personal authentication apparatus 51, allowing the personal authentication apparatus 51 to perform the authentication process based on images captured by the camera 52. The personal authentication apparatus 51 allows the camera to capture the driver's image and acquires the image captured by the camera 52. The personal authentication apparatus 51 compares the image captured by the camera 52 with the face feature information received from the in-vehicle apparatus 10 according to template matching to determine whether or not the user sitting on the driver's seat is the vehicle owner. The personal authentication apparatus 51 transmits a determination result to the in-vehicle apparatus 10.

At Step S805, the control section 11 determines whether or not the authentication succeeds (the vehicle owner is confirmed) based on the transmitted determination result.

The content usage permission process terminates when it is determined at Step S805 that the authentication fails. In this case, the in-vehicle apparatus 10 is disallowed or inhibited from content output and purchase.

The process proceeds to Step S806 when it is determined at Step S803 or S805 that the authentication succeeds. The control section 11 permits the content output and purchase.

The content usage permission process then terminates. In this case, the in-vehicle apparatus 10 is enabled for the content output and purchase.

The system permits the content output and purchase only when the vehicle owner gets in the vehicle 50.

<4-3. Effects>

As mentioned above, the information communication system according to the fourth embodiment provides the following effects in addition to the effects of the first embodiment.

When the vehicle owner does not get in the vehicle 50, the system prevents the in-vehicle apparatus 10 from outputting vehicle contents and purchasing a new vehicle content. The system can prevent vehicle contents from being illegally used and downloaded.

The vehicle owner is assumed to be present when his or her portable apparatus 20 is capable of radio communication with the in-vehicle apparatus 10. The presence of the vehicle owner can be easily determined. The vehicle owner is also assumed to be present when he or she is detected based on his or her face feature points even though his or her portable apparatus 20 is unavailable. The vehicle owner can output and purchase vehicle contents even when he or she does not carry the portable apparatus 20.

<4-4. Correspondence between Technical Terms Used for the Embodiments and Functions>

In the information communication system according to the fourth embodiment, the control section 11 performing Steps S801 through S806 of the content usage permission process (FIG. 11) may function as an owner determination control means or unit and an output inhibit control means or unit. Particularly, the control section 11 performing the process at Step S804 may function as a feature detection control means or unit. The correspondence for the other sections is the same as the first embodiment.

<5. Fifth Embodiment>

The information communication system according to a fifth embodiment will be described.

<5-1. Overall Construction>

Figure 12:
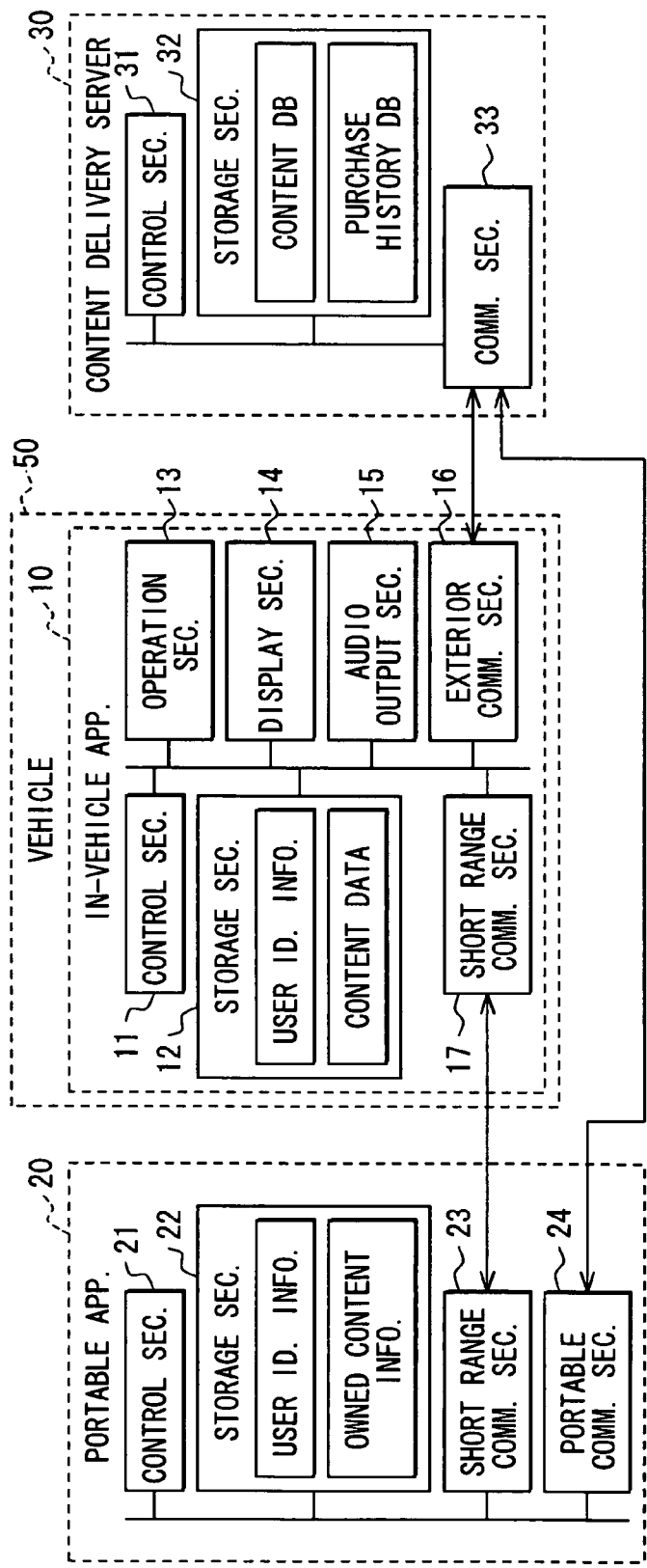
FIG. 12 is a block diagram schematically showing a construction of an information communication system according to a fifth embodiment.

FIG. 12 is a block diagram schematically showing a construction of the information communication system according to the fifth embodiment.

The information communication system according to the fifth embodiment differs from the information communication system (FIG. 1) according to the first embodiment in that the portable apparatus 20 includes a portable communication section 24 for data communication with the content delivery server 30 via the Internet. The following mainly describes differences from the information communication system according to the first embodiment. The same parts or components are depicted by the same reference numerals and a detailed description is omitted for simplicity.

<5-2. Processes Performed on the Information Communication System>

The following describes processes performed on the apparatuses 10, 20, and 30 included in the information communication system according to the fifth embodiment.

<5-2-1. Content Acquisition Process>

Figure 13:
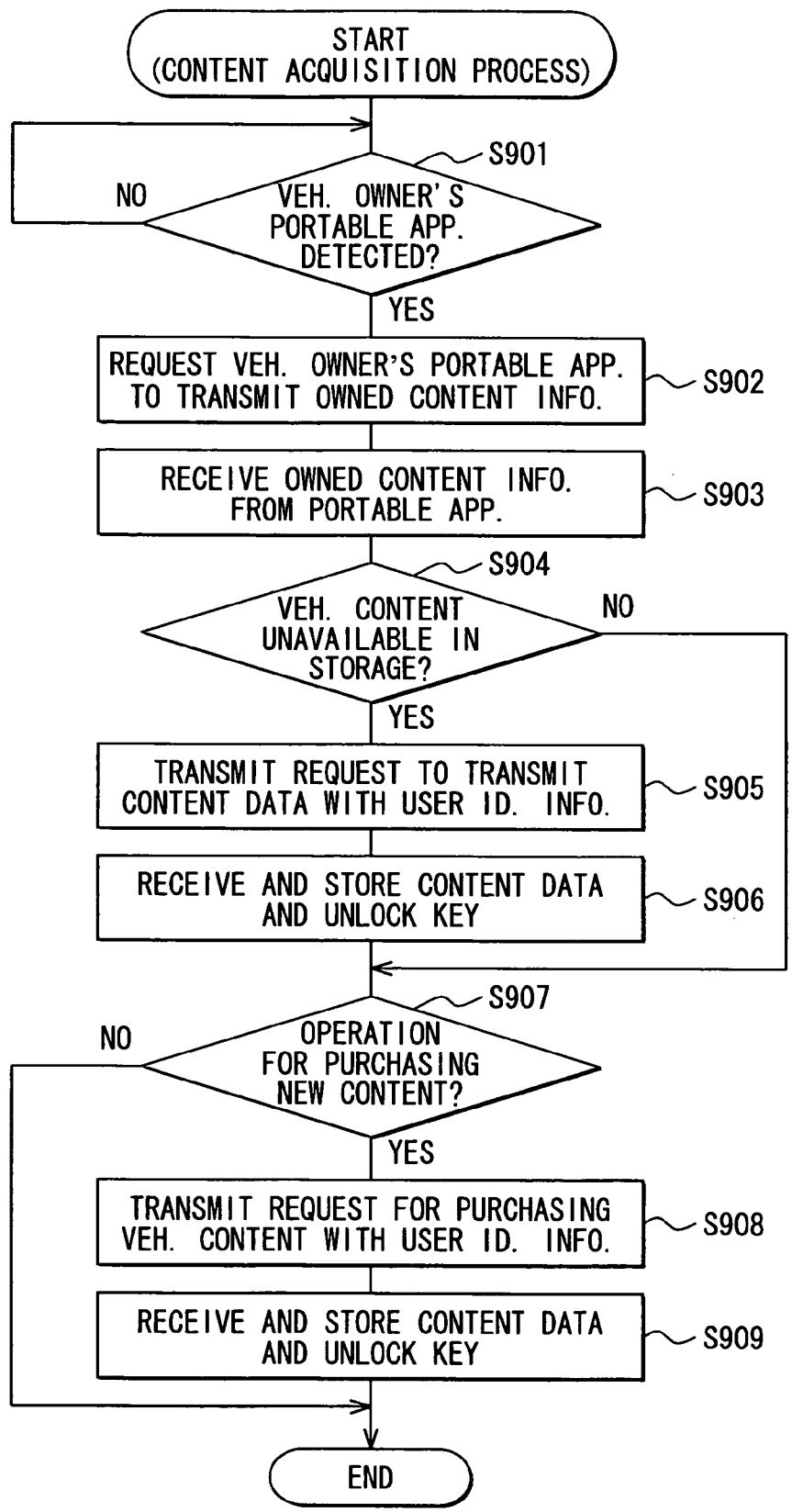
FIG. 13 is a flow chart showing a content acquisition process according to the fifth embodiment.

The following describes a content acquisition process performed by the control section 11 of the in-vehicle apparatus 10 with reference to a flow chart in FIG. 13. The content acquisition process according to the fifth embodiment differs from the content acquisition process according to the first embodiment in that Step S110 is not performed. The process contents of Steps S901 through S909 are the same as those of Steps S101 through S109 and a detailed description is omitted for simplicity.

<5-2-2. Information Transmission Process>

The information transmission process performed by the control section 21 of the portable apparatus 20 is the same as the information transmission process according to the first embodiment and a detailed description is omitted for simplicity.

<5-2-3. Content Delivery Process>

Figure 14:
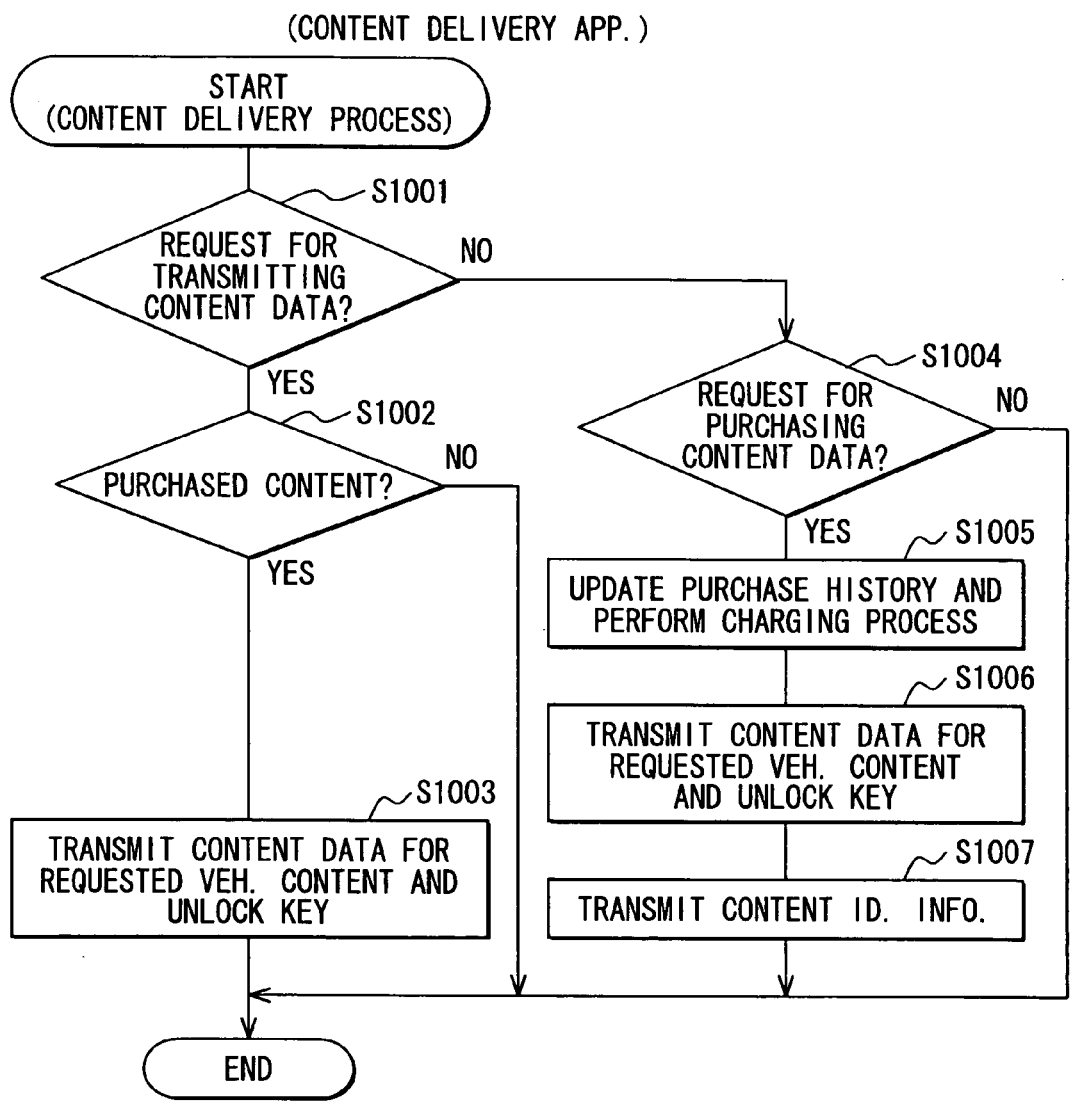
FIG. 14 is a flow chart showing a content delivery process according to the fifth embodiment.

The following describes a content delivery process performed by the control section 31 of the content delivery server 30 with reference to a flow chart in FIG. 14. The content delivery process according to the fifth embodiment differs from the content delivery process (FIG. 4) according to the first embodiment in that Step S1007 is added. The process contents of Steps S1001 through S1006 are the same as those of Steps S301 through S306 and a detailed description is omitted for simplicity.

At Step S1007, the control section 31 allows the communication section 33 to transmit the content identification information about a purchased vehicle content to the portable apparatus 20 owned by the vehicle owner. The information about the newly purchased vehicle content is added to the owned content information stored in the portable apparatus 20.

That is, the information communication system according to the fifth embodiment notifies the portable apparatus 20 of the content identification information about the newly purchased vehicle content from the content delivery server 30, not from the in-vehicle apparatus 10.

<5-3. Effects>

As mentioned above, the information communication system according to the fifth embodiment provides the same effects as the first embodiment.

<5-4. Correspondence between Technical Terms Used for the Embodiments and Functions>

In the information communication system according to the fifth embodiment, the in-vehicle apparatus 10 may function as a content output apparatus. The control section 11 performing Steps S901 through S906 of the content acquisition process (FIG. 2) may function as a content supplement control means or unit. The control section 11 performing Steps S907 through S907 may function as a content purchase control means or unit. The storage section 12 may function as a content storage device.

The portable apparatus 20 may function as a user apparatus. The control section 21 performing Steps S201 and S202 of the information transmission process (FIG. 3) may function as an owning information transmission control means or unit. The control section 21 performing Steps S203 and S204 may function as an owning information update control means or unit. The storage section 22 may function as an owning information storage device.

The content delivery server 30 may function as a content delivery apparatus. The control section 31 performing Steps S1001 through S1003 of the content delivery process (FIG. 4) may function as a content retransmission control means or unit. The control section 31 performing Steps S1004 through S1006 may function as a content transmission control means or unit. The control section 31 performing Step S1007 may function as a purchase information notification control means or unit.

<6. Modifications>

While there have been described specific preferred embodiments of the present invention, it is to be distinctly understood that the invention may be embodied in various modifications.

<6-1. Vehicle Content Purchaser>

When the in-vehicle apparatus 10 is used for operations to purchase vehicle contents, the above-mentioned embodiments assume the owner of the in-vehicle apparatus 10, i.e., the owner of the vehicle 50 mounted with the in-vehicle apparatus 10, to be a purchaser. The invention is not limited thereto. For example, the user is requested for purchase operations such as entering the purchaser's user identification information as well as a password etc. as needed. The user corresponding to the entered user identification information may be assumed to be a purchaser.

<6-2. Supplementing a Missing Vehicle Content>

The above-mentioned embodiments have described the constructions capable of downloading content data for vehicle contents already purchased by the user but not stored in the in-vehicle apparatus 10 or time-limited content data free of charge. The invention is not limited thereto. For example, such content data may be downloaded at a lower price than usual, not free.

According to the second embodiment, the in-vehicle apparatus 10 determines whether the content data or the time-limited content data should be downloaded. The invention is not limited thereto. For example, the content delivery server 30 may determine this.

Specifically, the content delivery server 30 stores identification information about each in-vehicle apparatus 10 using the content delivery server 30 in accordance with identification information about the user as the owner. The content delivery server 30 may receive a request to transmit content data and the user identification information from the in-vehicle apparatus 10. At this time, the content delivery server 30 transmits normal content data when the received user identification information indicates the user as the owner of the transmitting in-vehicle apparatus 10. On the other hand, the content delivery server 30 transmits time-limited content data when the received user identification information does not indicate the user as the owner of the transmitting in-vehicle apparatus 10. The effect similar to the second embodiment can be provided also in this manner.

The second embodiment downloads time-limited content data for a vehicle content that is purchased by the user, not the vehicle owner, and is not stored in the in-vehicle apparatus 10. Contents may be limited not only to a time period capable of output. For example, it may be preferable to download content data limited to be output only when the user gets in the vehicle 50.

<6-3. User Operation for Selecting Vehicle Contents>

According to the second embodiment, the display section 14 displays a list of vehicle contents that are purchased by the user, not the vehicle owner, and are not stored in the in-vehicle apparatus 10. The user is allowed to select a vehicle content from the list. The invention is not limited thereto. For example, vehicle contents may be displayed on a display means other than the display section 14 such as a display device in a combination meter of the vehicle 50 and a display section provided for the user's portable apparatus 20. Further, vehicle contents may be notified in a mode other than the display such as audio, for example.

<6-4. Updating the Owned Content Information>

When a new vehicle content is purchased on the PC 40, the third embodiment detects the purchaser's portable apparatus 20 and updates the owned content information. The invention is not limited thereto. For example, the owned content information may be updated when the user's portable apparatus 20 is detected independently of whether a vehicle content is purchased. There may be a case where a vehicle content is purchased but the purchaser's portable apparatus 20 is not detected, e.g., the purchaser does not carry the portable apparatus 20. In such case, the update process of the owned content information may be deferred until the portable apparatus 20 is detected thereafter.

<6-5. Physical Features Detected from the User>

The fourth embodiment determines the vehicle owner by detecting face feature points as the user's physical feature. The invention is not limited thereto. For example, the physical features may include features attributed to a personal body such as fingerprint, vein, iris, voiceprint, and retina. The vehicle owner can be determined based on his or her habit of driving the vehicle.

The fourth embodiment allows contents to be output and purchased only when the vehicle owner himself or herself gets into the vehicle 50. The invention is not limited thereto. For example, it may be preferable to allow contents to be output and purchased when multiple registered users (e.g., family members of the vehicle owner) get into the vehicle 50.

<6-6. Construction of the Portable Apparatus>

The above-mentioned embodiments have described the portable telephone terminal as the portable apparatus 20. The invention is not limited thereto. For example, it may be preferable to use storage apparatuses capable of wireless communication including a portable information device such as PDA, an electronic key (smart key) for the vehicle 50, etc. The portable apparatus 20 may be provided as a dedicated apparatus.

<6-7. Contents>

The above-mentioned embodiments have exemplified the constructions for outputting vehicle contents available on the in-vehicle apparatus 10. The invention is not limited thereto. Contents may be available elsewhere than the in-vehicle apparatus 10.

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

<Aspects>

Aspects of the disclosure described herein are set out in the following clauses.

According to a first aspect of the disclosure, an information communication system is provided as follows. A user can use purchased contents without needing complicated operations on a content output apparatus that does not store the content data. In this information communication system, a user apparatus owned by the user stores owned content information as a list of information (also referred to as "list information") about contents already purchased by the user. The owned content information is transmitted to the content output apparatus in wireless communication with the user apparatus. When the content output apparatus does not store the content already purchased by the user, the content output apparatus acquires content data for the content from the content delivery apparatus. The information communication system automatically supplements the content output apparatus to be used by the user with the content already purchased by the user. As a result, the user can use the purchased content on the content output apparatus without needing complicated operations.

Contents include music, speech, image, motion picture, text information, and map information. Generally, a content is purchased by acquiring content data based on payment of an equivalent price. In this aspect, however, the purchase does not necessarily require payment of an equivalent price but may signify acquisition of content data free of charge. Content output signifies replaying a music content or displaying an image content, for example.

As an optional aspect of the first aspect, the owned content information stored in the user apparatus can be updated as follows. When a content is purchased in the information communication system, the content output apparatus may transmit information about the content as new content information to the user apparatus. The user apparatus may add the content represented by the received new content information as a purchased content to the owned content information. When the user purchases a content in this construction, the owned content information stored in the user apparatus may be updated. The owned content information can be maintained to be up-to-date.

Additionally, the content output apparatus may transmit the new content information to the user apparatus of the user as a purchaser of the content. When there is a user apparatus of a user other than the purchaser, it is possible to prevent new content information from being transmitted to the user apparatus to inadvertently update the owned content information stored in the user apparatus.

A content purchaser may be a user as an owner of a content output apparatus. The user may be allowed to enter the owner information as well as a purchase request for a content.

As an optional aspect of the first aspect, there may be a content that is stored in the content output apparatus but is not stored in the user apparatus. The content output apparatus may transmit information about such content as new content information to the user apparatus. The user apparatus may add the content indicated by the received new content information as a purchased content to the owned content information. Even when a content is purchased without any user apparatus, the owned content information stored in the user apparatus can be updated to appropriate information later.

As an optional aspect of the first aspect, when a content is purchased in the information communication system, the content delivery apparatus may transmit information about the content as new content information to the user apparatus of a user as a purchaser of the content. The user apparatus may add the content indicated by the received new content information as a purchased content to the owned content information. According to such construction, the owned content information stored in the user apparatus is updated when the user purchases a content. The owned content information can be maintained to be up-to-date.

In the information communication system according to the first aspect, however, a content the user purchased using the content output apparatus is also supplemented to another content output apparatus. Such unconditional supplement is unfavorable in terms of copyright protection. When user A purchases a content using content output apparatus A1, for example, user A may supplement the content to another content output apparatus A2 owned by user A. Alternatively, user A may supplement the content to content output apparatus B owned by another user B. The latter needs to be regulated more strictly than the former.

As an optional aspect of the first aspect, when a user purchased a content not stored in the content output apparatus and the user is not registered, the information communication system may acquire limited content data from the content delivery apparatus. Such information communication system can prevent contents from being acquired illegally. The registered user may be a user who owns the content output apparatus, for example.

Additionally, in this case, the user may be allowed to select limited content data to be acquired. It is possible to prevent unnecessary limited content data from being acquired automatically despite the intention of the user.

As an optional aspect of the first aspect, to strengthen the copyright protection, it may be preferable to inhibit at least one of outputting a content represented by content data stored in the content storage device and purchasing a new content when there is no registered user. Such construction can prevent illegally acquire or use contents.

Additionally, for example, it may be preferable to determine the presence of a registered user when the registered user's user apparatus is capable of wireless communication with the content output apparatus. The presence of a registered user can be determined easily.

Further additionally, for example, it may be preferable to determine the presence of a registered user when the feature detection control unit detects the registered user's physical feature. The registered user can use contents even when he or she does not own the user apparatus.

It is preferable to supplement the content output apparatus to be used by the user with a content already purchased by the user as early as possible.

As an optional aspect of the first aspect, in the information communication system, the user apparatus may transmit owned content information to the content output apparatus upon detection of the content output apparatus capable of wireless communication with the user apparatus. Accordingly, contents can be supplemented early.

As an optional aspect of the first aspect, the content output apparatus may be mounted on a vehicle for use. In this case, a user owning multiple vehicles can use a content purchased on one vehicle also on another vehicle.

As another aspect of the disclosure, the content output apparatus included in the above information communication system of the first aspect is provided.

As another aspect of the disclosure, the user apparatus included in the above information communication system of the first aspect is provided.

As another aspect of the disclosure, the content delivery apparatus included in the above information communication system of the first aspect is provided.

According to another aspect of the disclosure, a method is provided for controlling the above content output apparatus. The method comprises: (i) transmitting, when a user requests to purchase a content, a purchase request for content data along with purchaser information capable of specifying a user as a purchaser to the content delivery apparatus and storing content data received from the content delivery apparatus in the content storage device; and (ii) transmitting, when the content storage device does not store content data for a content specified based on owned content information received from a user apparatus capable of wireless communication with the content output apparatus, a request to transmit unstored content data along with owner information capable of specifying a user of the user apparatus to the content delivery apparatus and storing content data received from the content delivery apparatus in the content storage device. Relating to this aspect, as yet another aspect of the disclosure, a computer readable medium comprising instructions being executed by a computer is provided, wherein the instructions includes the above method for controlling the content output apparatus and the method is computer-implemented.

According to another aspect of the disclosure, a method is provided for controlling the above user apparatus. The method comprises: transmitting the owned content information to a content output apparatus capable of wireless communication with the user apparatus. Relating to this aspect, as yet another aspect of the disclosure, a computer readable medium comprising instructions being executed by a computer is provided, wherein the instructions includes the above method for controlling the user apparatus and the method is computer-implemented.

According to another aspect of the disclosure, a method is provided for controlling the above content delivery apparatus. The method comprises: (i) storing, when receiving a purchase request for content data from the content output apparatus, purchase information about a content as a purchase history of a user specified based on purchaser information received with the purchase request and transmitting the content data to a requesting content output apparatus; and (ii) transmitting, when receiving a transmission request for content data from the content output apparatus, the content data to a requesting content output apparatus on condition that purchase information about the content is stored as a purchase history of a user specified based on owner information received with the transmission request. Relating to this aspect, as yet another aspect of the disclosure, a computer readable medium comprising instructions being executed by a computer is provided, wherein the instructions includes the above method for controlling the content delivery apparatus and the method is computer-implemented.

It will be obvious to those skilled in the art that various changes may be made in the above-described embodiments of the present invention. However, the scope of the present invention should be determined by the following claims.

What is claimed is:

1. An information communication system comprising:
a content output apparatus configured to output, as an output content, content data stored in a content storage device,
a content delivery apparatus for delivering the content data to the content output apparatus, and
a user apparatus configured to be carried by a user using the content output apparatus,
wherein the user apparatus includes:
a first wireless communication section;
an owning information storage device configured to store owned-content identification information in a list indicating the content data already purchased by the user of the user apparatus, the content identification information uniquely specifies the content; and
an owning information transmission control unit cooperatively operable with the first wireless communication section and the owning information storage device, and configured to transmit the owned-content identification information over the first wireless communication section to the content output apparatus,
wherein the content output apparatus includes:
a second wireless communication section,
a first exterior communication section,
a content purchase control unit cooperatively operable with the first exterior communication section and configured to
transmit a purchase request over the first exterior communication section for the content data along with purchaser information specifying the user as a purchaser to the content delivery apparatus, when the user requests to purchase the content data, and store the content data in the content storage device when the content data is received over the first exterior communication section from the content delivery apparatus; and
a content supplement control unit cooperatively operable with the first exterior communication section and the second wireless communication section, and configured to
execute a determination as to whether the content storage device does not store the content data that was already purchased by the user and is specified based on the owned-content identification information, when receiving the owned-content identification information over the second wireless communication section from the user apparatus,
transmit a transmission request to transmit the content data, which is specified based on the owned-content identification information of content data that was already purchased by the user but is not stored in the content storage device, along with owner information specifying the user of the user apparatus, over the first exterior communication section to the content delivery apparatus, and then to store the content data received over the first exterior communication section from the content delivery apparatus in the content storage device, when the determination that the content storage device does not store the content data, which is specified based on the owned-content identification information and was already purchased by the user, is made, and
not transmit the transmission request to transmit the content data that is specified based on the owned-content identification information, when the determination that the content storage device stores the content data, which is specified based on the owned-content identification information of content data that was already purchased by the user, is made,
wherein the content delivery apparatus includes:
a second exterior communication section,
a content transmission control unit cooperatively operable with the second exterior communication section and configured to
store, in a purchase history of the user, purchase information that indicates the content data purchased by the user, from the purchaser information received along with the purchase request, when the purchase request for the content data is received over the second exterior communication section from the content output apparatus, and
transmit the content data over the second exterior communication section to the content output apparatus; and
a content retransmission control unit cooperatively operable with the second exterior communication section and configured to transmit the content data to the content output apparatus when the purchase information about the content data is stored as the purchase history of the user specified based on the owner information received over the second exterior communication section along with the transmission request, when the transmission request for the content data is received over the second exterior communication section from the content output apparatus,
wherein the content output apparatus includes:
an owner determination control unit for determining whether a registered user is present and a usage inhibition control unit configured to inhibit at least one of (i) outputting a content represented by content data stored in the content storage device and (ii) purchasing a new content, when the owner determination control unit determines the registered user is not present; and wherein the owner determination control unit determines the registered user is present when the user apparatus is in wireless communication over the first and second wireless communication sections with the content output apparatus.

2. The information communication system according to claim 1, wherein the content output apparatus includes a purchase information notification control unit for transmitting, as new content information, information about the content corresponding to the content data stored by the content purchase control unit in the content storage device, over the first wireless communication section to the user apparatus, and wherein the user apparatus includes an owning information update control unit that adds the content corresponding to the new content information as a purchased content, to the owned-content identification information, when the user apparatus receives the new content information over the first exterior communication section.

3. The information communication system according to claim 2, wherein the purchase information notification control unit transmits the new content information over the second wireless communication section to the user apparatus.

4. The information communication system according to claim 1, wherein the content output apparatus includes an owning information notification control unit configured to transmit information over the second wireless communication section to the user apparatus about the content corresponding to content data as new content information, when the content data stored in the content storage device is excluded from the content specified based on owned-content identification information received over the second wireless communication section from the user apparatus, and wherein the user apparatus includes an owning information update control unit configured to add the content corresponding to the new content information as a purchased content to the owned-content identification information, when receiving the new content information over the first exterior communication section.

5. The information communication system according to claim 1, wherein the content delivery apparatus includes a purchase information notification control unit for transmitting information, as new content information, about a content corresponding to the content data transmitted by the content transmission control unit over the second wireless communication section to the user apparatus, and wherein the user apparatus includes an owning information update control unit configured to add, to the owned-content identification information, the content corresponding to the new content information as purchased content, when receiving the new content information over the first exterior communication section.

6. The information communication system according to claim 1, wherein the content output apparatus includes a feature detection control unit for detecting a physical feature of the user, and wherein the owner determination control unit determines that the registered user is present when the feature detection control unit detects the physical feature of the registered user.

7. The information communication system according to claim 1, wherein the owning information transmission control unit transmits the owned-content identification information over the first wireless communication section to the content output apparatus, when the owning information transmission control unit detects that the content output apparatus is in wireless communication over the first and second wireless communication sections with the user apparatus.

8. The information communication system according to claim 1, wherein the content output apparatus is mounted on a vehicle for use.

9. The information communication system of claim 1, wherein the content output apparatus replays or displays the output content from the content data to provide the output content to the user, and wherein the owned-content identification information is list information that uniquely specifies the output content and a part of the content data is used as the content identification information.

10. A content output apparatus for use in an information communication system that includes a content delivery apparatus that delivers content data to the content output apparatus, the content being represented by content data,; and a user apparatus configured to be carried by a user using the content output apparatus, the user apparatus including an owning information storage device that stores the owned-content identification information in a list indicating content data already purchased by the user, the content identification information uniquely specifies the content; the content output apparatus comprising:

a content output device configured to output a content corresponding to content data stored in a content storage device;

a wireless communication section, an exterior communication section, a content purchase control unit cooperatively operable with the exterior communication section and configured to transmit a purchase request over the exterior communication section for the content data along with purchaser information specifying the user as a purchaser to the content delivery apparatus, when the user requests to purchase the content data, and store the content data in the content storage device when the content data is received over the exterior communication section from the content delivery apparatus;

a content supplement control unit cooperatively operable with the exterior communication section and the wireless communication section, and configured to execute a determination as to whether the content storage device does not store the content data that was already purchased by the user and is specified based on the owned-content identification information, when receiving the owned-content identification information over the wireless communication section from the user apparatus, transmit a transmission request to transmit the content data, which is specified based on the owned-content identification information of content data that was already purchased by the user but is not stored in the content storage device, along with owner information specifying the user of the user apparatus, over the exterior communication section to the content delivery apparatus, and then to store the content data received over the exterior communication section from the content delivery apparatus in the content storage device, when the determination that the content storage device does not store the content data, which is specified based on the owned-content identification information and was already purchased by the user, is made, and not transmit the transmission request to transmit the content data that is specified based on the owned-content identification information, when the determination that the content storage device stores the content data, which is specified based on the owned-content identification information of content data that was already purchased by the user, is made, and store the content data received from the content delivery apparatus in the content storage device;

an owner determination control unit for determining whether a registered user is present; and a usage inhibition control unit configured to inhibit at least one of (i) outputting a content represented by content data stored in the content storage device and (ii) purchasing a new content, when the owner determination control unit determines that registered user is not present;

wherein the owner determination control unit determines the registered user is present when the user apparatus is in wireless communication over the wireless communication section with the content output apparatus.

11. The content output apparatus according to claim 10, wherein the content output apparatus includes a purchase information notification control unit for transmitting, as new content information, information about the content corresponding to the content data stored by the content purchase control unit in the content storage device, over the wireless communication section to the user apparatus.

12. The content output apparatus according to claim 11, wherein the purchase information notification control unit transmits the new content information over the wireless communication section to the user apparatus.

13. The content output apparatus according to claim 10, wherein the content output apparatus includes an owning information notification control unit configured to transmit information over the wireless communication section to the user apparatus about the content corresponding to content data as new content information, when the content data stored in the content storage device is excluded from the content specified based on owned-content identification information received over the wireless communication section from the user apparatus.

14. The content output apparatus according to claim 10, wherein the content output apparatus includes a feature detection control unit for detecting a physical feature of the user, and wherein the owner determination control unit determines that the registered user is present when the feature detection control unit detects the physical feature of the registered user.

15. The content output apparatus of claim 10, wherein the content output apparatus replays or displays the output content from the content data to provide the output content to the user, and wherein the owned-content identification information is list information that uniquely specifies the output content and a part of the content data is used as the content identification information.

16. An information communication system comprising:

a content output apparatus configured to output a content represented by content data stored in a content storage device, the content output apparatus including a content supplement control unit configured to cause the content storage device to store content data, which indicates a content that was already purchased by a user;

a content delivery apparatus configured to deliver content data to the content output apparatus, the content delivery apparatus configured to store a purchase history database that manages a history of a content already purchased by the user and a content retransmission control unit configured to transmit content data to the content output apparatus, wherein the history in the purchase history database indicates a content that was already purchased by the user; and a user apparatus configured to be carried by a user, the user apparatus including an owning information storage device configured to store owned-content information that is list information about a content that was already purchased by the user and an owning information transmission control unit configured to transmit the list information to the content output apparatus, wherein:

(i) when detecting that wireless communication is enabled with the content output apparatus, the owning information transmission control unit of the user apparatus transmits the list information about the content, which was already purchased by the user in the past, to the content output apparatus;

(ii) when receiving the list information, indicating content that was already purchased by the user, from the user apparatus with which the wireless communication is enabled, the content supplement control unit of the content output apparatus executes a determination as to whether the content storage device stores content data, which is specified based on the received list information about the content that was already purchased by the user in the past;

(iii) when determining that the content storage device does not store the content data, which is specified based on the list information about the content that was already purchased by the user in the past, the content supplement control unit transmits a transmission request to transmit the content data, which is specified based on the list information about the content that was already purchased by the user in the past but is not stored in the content storage device, along with owner information, which specifies the user, to the content delivery apparatus;

(iv) when receiving from the content output apparatus the transmission request to transmit the content data, which was specified in the content output apparatus based on the list information about the content that was already purchased by the user in the past, along with the owner information specifying the user, the content retransmission control unit of the content delivery apparatus determines whether a content corresponding to the content data, which was specified in the content output apparatus based on the list information about the content that was already purchased by the user in the past, is already purchased by a user, who is specified based on the owner information specifying the user, by referencing the purchase history database that manages the history of the content purchased in the past, and (v) when determining that the content corresponding to the content data, which was specified in the content output apparatus based on the list information about the content that was already purchased by the user in the past, is already purchased by the user specified based on the new owner information, the content retransmission control unit of the content delivery apparatus transmits the content data, which was specified in the content output apparatus based on the list information about the content that was already purchased by the user in the past, to the content output apparatus from which the transmission request was received; and (vi) when receiving the data content, which was specified in the content output apparatus based on the list information about the content that was already purchased by the user in the past, from the content delivery apparatus, the content supplement control unit of the content output apparatus causes the content storage device to store the content data, which is received from the content delivery apparatus and was specified in the content output apparatus based on the list information about the content that was already purchased by the user in the past the content output apparatus includes a first wireless communication section, the user apparatus includes a second wireless communication section;

the content output apparatus further includes an owner determination control unit for determining whether a registered user is present when the user apparatus is in wireless communication over the first and second wireless communication sections with the content output apparatus, and a usage inhibition control unit configured to inhibit at least one of (i) outputting a content represented by content data stored in the content storage device and (ii) purchasing a new content, when the owner determination control unit determines the registered user is not present.

17. The information communication system according to claim 16, the content output apparatus further including an operation section configured to be operated by the user to request a purchase of a content, and a content purchase control unit configured to store content data, which corresponds to the new content whose purchase is requested, in the content storage device, the content delivery apparatus further including a content transmission control unit configured to transmit content data corresponding to a content to the content output apparatus, wherein:

(i) when the user requests a purchase of a new content via the operation section, the content purchase control unit of the content output apparatus transmits a request of a purchase of content data corresponding to the new content along with purchaser information specifying the user as a purchaser to the content delivery apparatus;

(ii) when receiving the request of the purchase of the content data corresponding to the new content from the content output apparatus, the content transmission control unit of the content delivery apparatus stores purchase information about the content data corresponding to the new content as a purchase history of the user, who is specified based on the purchaser information received along with the request of the purchase, in the purchase history database, and transmits the content data corresponding to the new content to the content output apparatus from which the request of the purchase was received; and (iii) when the content data corresponding to the new content is received from the content delivery apparatus, the content purchase control unit of the content output apparatus causes the content storage device to store the content data corresponding to the new content.

18. The information communication system according to claim 16, wherein when the content supplement control unit of the content output apparatus determines that the content storage device does not store the content data, which is specified based on the received list information about the content that was already purchased by the user in the past, the content data, which is specified based on the received list information about the content that was already purchased by the user in the past, is determined to have been purchased by the user in the past using an apparatus other than the content output apparatus.

19. A method for acquiring content data representing a content that is purchased in an information communication system, the information communication system including:

a content output apparatus to output a content represented by content data stored in a content storage device, the content output apparatus including a first wireless communication section, an owner determination control unit and a usage inhibition control unit; a content delivery apparatus to deliver content data to the content output apparatus while storing a purchase history database to manage a history of a content purchased by a user; and a user apparatus carried by a user, the user apparatus including a second wireless communication section and an owning information storage device to store owned-content information that is list information about a content that was already purchased by the user and transmitting the list information to the content output apparatus, the method comprising:

detecting by the content output apparatus that wireless communication is enabled with the user apparatus;

then receiving, by the content output apparatus, from the user apparatus with which the wireless communication is enabled, the list information about the content, which was already purchased by the user in the past;

then determining by the content output apparatus whether the content storage device stores content data, which is specified based on the list information about the content having been already purchased by the user in the past;

then transmitting by the content output apparatus, when determining that the content storage device does not store the content data which is specified based on the list information about the content having been already purchased by the user in the past, a transmission request to transmit the content data, which is specified based on the list information about the content having been already purchased by the user in the past but is not stored in the content storage device, along with owner information, which specifies the user, to the content delivery apparatus;

then receiving by the content delivery apparatus from the content output apparatus the transmission request to transmit the content data, which was specified in the content output apparatus based on the list information about the content having been already purchased by the user in the past, along with the owner information specifying the user;

then determining by the content delivery apparatus, whether a content corresponding to the content data, which was specified in the content output apparatus based on the list information about the content having been already purchased by the user in the past, was already purchased by a user, who is specified based on the owner information specifying the user, by referencing the purchase history database that manages the history of the content purchased in the past;

then transmitting by the content delivery apparatus, when determining that the content corresponding to the content data, which was specified in the content output apparatus based on the list information about the content having been already purchased by the user in the past, was already purchased by the user specified based on the owner information, the content data which was specified in the content output apparatus based on the list information about the content having been already purchased by the user in the past, to the content output apparatus from which the transmission request was received; and then receiving by the content output apparatus the data content, which was specified in the content output apparatus based on the list information about the content having been already purchased by the user in the past, from the content delivery apparatus;

then storing by the content output apparatus in the content storage device the content data, which was received from the content delivery apparatus and was specified in the content output apparatus based on the list information about the content having been already purchased by the user in the past;

the owner determination control unit determining whether a registered user is present when the user apparatus is in wireless communication over the first and second wireless communication sections with the content output apparatus;

the usage inhibition control unit inhibiting at least one of (i) outputting a content represented by content data stored in the content storage device and (ii) purchasing a new content, when the owner determination control unit determines the registered user is not present.

\* \* \* \* \*